(12) United States Patent
Nakagawa et al.

(10) Patent No.: US 9,195,917 B2
(45) Date of Patent: Nov. 24, 2015

(54) DITHER PATTERN FORMING METHOD AND DITHER PATTERN

(71) Applicant: CANON KABUSHIKI KAISHA, Tokyo (JP)

(72) Inventors: Junichi Nakagawa, Tokyo (JP); Mitsuhiro Ono, Tokyo (JP); Hidetsugu Kagawa, Kawasaki (JP); Nobutaka Miyake, Yokohama (JP); Akitoshi Yamada, Yokohama (JP); Fumitaka Goto, Tokyo (JP); Ryosuke Iguchi, Kawasaki (JP); Tomokazu Ishikawa, Yokohama (JP); Senichi Saito, Funabashi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/076,719

(22) Filed: Nov. 11, 2013

(65) Prior Publication Data

US 2014/0139885 A1    May 22, 2014

(30) Foreign Application Priority Data

Nov. 16, 2012 (JP) ................................. 2012-252255
Nov. 16, 2012 (JP) ................................. 2012-252256
Nov. 16, 2012 (JP) ................................. 2012-252261

(51) Int. Cl.
*G06K 15/00* (2006.01)
*H04N 1/405* (2006.01)
(Continued)

(52) U.S. Cl.
CPC ............ *G06K 15/107* (2013.01); *H04N 1/4051* (2013.01); *H04N 1/4053* (2013.01);
(Continued)

(58) Field of Classification Search
USPC .............. 358/3.06, 3.13, 3.18, 3.19, 535, 536
See application file for complete search history.

(56) References Cited

U.S. PATENT DOCUMENTS 5,745,660 A * 4/1998 Kolpatzik et al. ............ 358/3.19
6,511,143 B1 * 1/2003 Ishikawa et al. .................. 347/9
(Continued)

FOREIGN PATENT DOCUMENTS

| JP | 2000-103088 A | 4/2000 |
|---|---|---|
| JP | 2007-129652 A | 5/2007 |
| JP | 2011-000801 A | 1/2011 |

OTHER PUBLICATIONS

U.S. Appl. No. 14/076,710, filed Nov. 11, 2013, Inventors: Ryosuke Iguchi, Nobutaka Miyake, Akitoshi Yamada, Mitsuhiro Ono, Fumitaka Goto, Hidetsugu Kagawa, Tomokazu Ishikawa, Junichi Nakagawa, and Senichi Saito.

(Continued)

*Primary Examiner* — Richard Zhu
(74) *Attorney, Agent, or Firm* — Fitzpatrick, Cella, Harper & Scinto

(57) ABSTRACT

In order to print a unit area of a print medium by a first printing scan and a second printing scan, dither patterns are formed which can control the arrangement of dots on the print medium without adverse effects of density unevenness and graininess, that are caused by printing position displacement. Regarding first and second dither patterns, information indicating whether or not a threshold is already set to a reference pixel and one or more pixels around the reference pixel in the first dither pattern is obtained for cases where each pixel in the first dither pattern is the reference pixel. A pixel in the second dither pattern to which a predetermined pixel is to be set is determined based on the obtained information. The first and second dither patterns formed in the above manner are associated with the first printing scan and the second printing scan, respectively.

19 Claims, 30 Drawing Sheets

(51) Int. Cl.
  *G06K 15/10* (2006.01)
  *H04N 1/52* (2006.01)
  *H04N 1/191* (2006.01)

(52) U.S. Cl.
  CPC .............. *H04N 1/52* (2013.01); *G06K 15/105* (2013.01); *G06K 2215/111* (2013.01); *H04N 1/1911* (2013.01); *H04N 1/1915* (2013.01)

(56) References Cited

U.S. PATENT DOCUMENTS

| | | | | |
|---|---|---|---|---|
| 7,130,085 | B2* | 10/2006 | Ohara et al. | 358/3.06 |
| 8,482,826 | B2* | 7/2013 | Marumoto | 358/521 |
| 8,503,031 | B2 | 8/2013 | Kajihara et al. | |
| 2003/0035146 | A1* | 2/2003 | Yu et al. | 358/3.14 |
| 2003/0133160 | A1* | 7/2003 | Sharma et al. | 358/3.06 |
| 2004/0252346 | A1* | 12/2004 | Huang et al. | 358/3.14 |
| 2007/0097164 | A1* | 5/2007 | Marumoto | 347/15 |
| 2007/0236526 | A1* | 10/2007 | Noguchi et al. | 347/15 |
| 2008/0180475 | A1* | 7/2008 | Eldar et al. | 347/13 |
| 2009/0015871 | A1* | 1/2009 | Kakutani | 358/3.13 |
| 2009/0168087 | A1* | 7/2009 | Fujimoto et al. | 358/1.9 |
| 2009/0310150 | A1* | 12/2009 | Marumoto | 358/1.8 |
| 2010/0141972 | A1* | 6/2010 | Yanai | 358/1.9 |

OTHER PUBLICATIONS

U.S. Appl. No. 14/076,608, filed Nov. 11, 2013, Inventors: Akitoshi Yamada, Tomokazu Ishikawa, Senichi Saito, Fumitaka Goto, Nobutaka Miyake, Mitsuhiro Ono, Ryosuke Iguchi, Hidetsugu Kagawa, and Junichi Nakagawa.

U.S. Appl. No. 14/076,622, filed Nov. 11, 2013, Inventors: Fumitaka Goto, Akitoshi Yamada, Tomokazu Ishikawa, Senichi Saito, Nobutaka Miyake, Mitsuhiro Ono, Ryosuke Iguchi, Hidetsugu Kagawa, and Junichi Nakagawa.

U.S. Appl. No. 14/076,647, filed Nov. 11, 2013, Inventors: Senichi Saito, Akitoshi Yamada, Tomokazu Ishikawa, Fumitaka Goto, Nobutaka Miyake, Mitsuhiro Ono, Ryosuke Iguchi, Hidetsugu Kagawa, and Junichi Nakagawa.

* cited by examiner

● DOT PRINTED BY FIRST PRINTING SCAN

○ DOT PRINTED BY SECOND PRINTING SCAN

⊗ DOT PRINTED BY FIRST AND SECOND PRINTING SCANS

DITHER PATTERN FORMING METHOD AND DITHER PATTERN

BACKGROUND OF THE INVENTION

1. Field of the Invention

The present invention relates to a dither pattern which can be used for image processing for forming an image on a print medium by using a plurality of printing heads for ejecting ink and a method for forming the dither pattern. Further, the present invention relates to an image printing method and an image printing apparatus for printing an image on a print medium by performing the image processing.

2. Description of the Related Art

In a serial type printing apparatus for printing an image by printing dots on a print medium by using a plurality of printing elements, multi-pass printing is often adopted to reduce density unevenness and stripes in a printed image. In multi-pass printing, an image which can be printed by one printing scan of a printing head is printed in a stepwise manner by a plurality of printing scans of the printing head. In this multi-pass printing, a print medium is conveyed between scans a distance which is smaller than a print width of the printing head, whereby it is possible to make inconspicuous stripes and density unevenness in an image caused by variation in the ejecting characteristics of each printing element and in a conveyance amount.

Incidentally, in the case of performing such multi-pass printing, it is conventionally common to determine print data for each printing scan by performing logical AND between binary data for each pixel in which printing (1) or non-printing (0) of a dot is specified and a plurality of mask patterns. More specifically, the mask patterns for printing scans in which allowance (1) or non-allowance (0) of dot printing is specified for each pixel are prepared such that the mask patterns have a complementary relationship. Dots to be actually printed by each printing scan are determined by performing logical AND between the plurality of mask patterns and binarized image data. In the multi-pass printing using the mask patterns, even if image data to be printed is divided into a plurality of printing scans, dots can be printed while an exclusive and complementary relationship among the printing scans is maintained. Accordingly, stripes and density unevenness can be inhibited without impairing density information which the image data has.

However, in the above multi-pass printing, groups of dots printed by the plurality of printing scans have a completely exclusive relationship among each other. Accordingly, in a case where a conveyance error occurs abruptly, displacement among groups of dots may change the coverage of dots on a print medium and cause density unevenness.

Japanese Patent Laid-Open Nos. 2000-103088 and 2011-000801 disclose a method for reducing the above adverse effects on an image, including: dividing multi-valued image data before binarization into a plurality of portions corresponding to individual printing scans; and binarizing each of the divided multi-valued image data by error diffusion methods independently without correlation.

FIGS. 28A and 28B show a dot arrangement in a case where multi-pass printing is performed by using masks having a complementary relationship (FIG. 28A) and a dot arrangement in a case where multi-pass printing is performed by the method disclosed in Japanese Patent Laid-Open Nos. 2000-103088 and 2011-000801 (FIG. 28B) for the sake of comparison. For the sake of simplicity, the figures show a case of 2-pass multi-pass printing that is performed by two printing scans to complete an image. In the figures, a black circle 41 represents a dot printed by a first printing scan, a white circle 42 represents a dot printed by a second printing scan, and a grid-pattern circle 43 represents a dot printed in an overlapping manner by the first and second printing scans.

In a case where multi-pass printing is performed by using mask patterns having a complementary relationship, dots printed by the first printing scan and dots printed by the second printing scan are in exclusive positions. Accordingly, as shown in FIG. 28A, there is no dot (grid-pattern circle) printed in an overlapping manner by the two printing scans. On the other hand, in a case where the multi-valued image data is divided into for the first printing scan and the second printing scan and thereafter the divided data are binarized respectively as disclosed in Japanese Patent Laid-Open Nos. 2000-103088 and 2011-000801, without correlation, and the dots printed by the first printing scan and the dots printed by the second printing scan do not have an exclusive and complementary relationship. In other words, as shown in FIG. 28B, there are dots (black circles and white circles) printed only by one of the two printing scans, but there are some overlapping dots (grid-pattern circles) printed in an overlapping manner.

A case where a conveyance error of one pixel occurs in a conveyance operation between the first printing scan and the second printing scan will be considered below. In the case of FIG. 28A, the group of the white circles is shifted one pixel in the same direction relative to the group of the black circles, and the black circles and the white circles completely overlap each other. As a result, the coverage of dots on the print medium decreases greatly, and the density of the image decreases as well. In a case where an area in which printing position displacement between the first printing scan and the second printing scan occurs, exists among areas in which printing position displacement does not occur, density unevenness is recognized. On the other hand, in the case of FIG. 28B, there are areas in which a black circle and a white circle overlap each other, but there are also areas in which a black circle or a white circle separated from an overlapping dot (grid-pattern circle). As a result, the coverage of dots on the print medium does not change greatly, and accordingly, the density of the image changes little.

As stated above, density unevenness caused by printing position displacement between printing scans can be inhibited by previously preparing dots to be printed in an overlapping manner by a plurality of printing scans based on Japanese Patent Laid-Open Nos. 2000-103088 and 2011-000801.

Incidentally, the printing method disclosed in Japanese Patent Laid-Open Nos. 2000-103088 and 2011-000801 can also be applied to a full-line type printing apparatus having a plurality of printing heads for ejecting inks of different colors. In a case where in the full-line type printing apparatus having the plurality of printing heads, a mounting error between printing heads, variation in the speed of scanning a print medium, or the like occurs, there occurs displacement of the position where each printing head prints the print medium, and the overlapping state of dots becomes unstable. As a result, there is a case where the coverage of dots on the print medium changes, and the desired density or hue of the image cannot be obtained.

Even in such a case, it becomes possible to establish a position relationship between dots printed by the printing heads as shown in FIG. 28B by quantizing print data for the plurality of printing heads by different error diffusion methods as disclosed in the above patent literatures. As a result, it becomes possible to inhibit density variation and hue variation caused by printing position displacement.

However, the configuration disclosed in Japanese Patent Laid-Open Nos. 2000-103088 and 2011-000801 cannot optimize the number of overlapping dots although it is possible to print some overlapping dots. Accordingly, there is a case where since the number of overlapping dots is too small, the effect of reducing density unevenness is not sufficiently obtained, and there is also a case where since the number of overlapping dots is much larger than necessary, the density of a real image is not sufficient. Further, there is almost no concern that in a low gradation region in which the number of printed dots is small, density variation and hue variation are caused by dot printing position displacement, but there is a case where overlapping dots are formed in the low gradation region and deteriorate the graininess of the image.

The above phenomena are caused by performing error diffusion for divided image data in parallel without correlation. According to the configuration disclosed in Japanese Patent Laid-Open Nos. 2000-103088 and 2011-000801, the arrangement of dots on a print medium depends on error diffusion methods adopted for divided image data. However, these error diffusion methods are not designed in consideration of superimposing images after binarization again and printing the superimposed images, and it is impossible to control the dispersion of dots and the number of overlapping dots after printing, and the like.

SUMMARY OF THE INVENTION

The present invention is made to solve the above problems. Accordingly, an object of the present invention is to provide, for a quantization process, a dither pattern which makes it possible to control the arrangement of dots on a print medium more actively, thereby outputting a high-quality image which is not adversely affected by density unevenness, graininess, or low density that are caused by printing position displacement.

Further features of the present invention will become apparent from the following description of exemplary embodiments (with reference to the attached drawings).

DESCRIPTION OF THE EMBODIMENTS

In the following, embodiments of the present invention will be explained in detail with reference to the attached drawings.

First Embodiment

Figure 1:
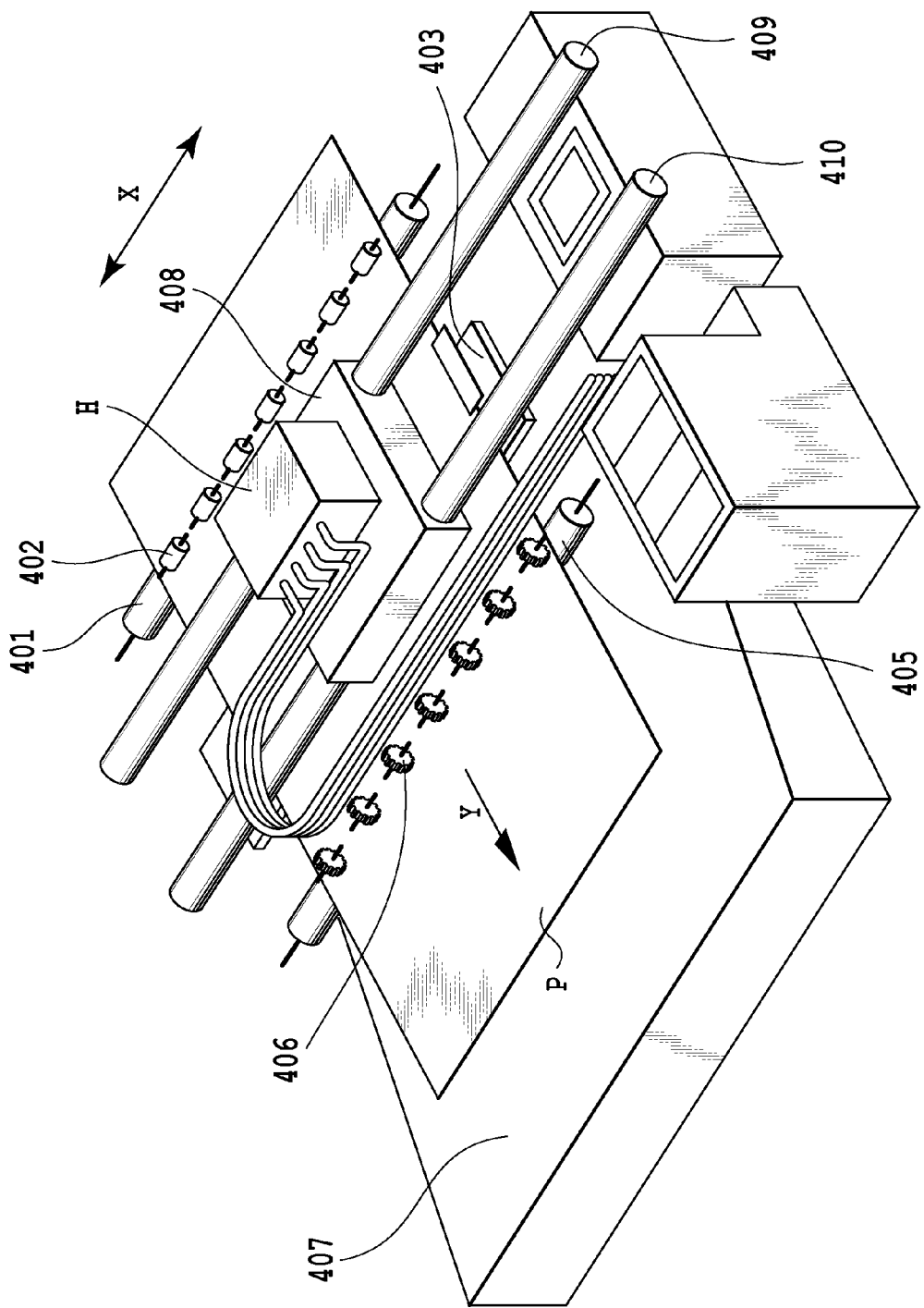
FIG. 1 is a perspective view schematically showing a printing unit of a serial type inkjet printing apparatus.

FIG. 1 is a perspective view schematically showing a printing unit of a serial type inkjet printing apparatus (image printing apparatus) to which a dither pattern formed in the present embodiment can be applied. A print medium P which is fed to a printing unit is conveyed in the direction of arrow Y (sub scanning direction) by a nip section consisted of a conveying roller 401 which is located on a conveying path and a pinch roller 402 which follows the conveying roller 401 while the conveying roller 401 rotates. The pinch roller 402 is elastically pressed against the conveying roller 401 by a pressing means such as a spring (not shown in the figure). The conveying roller 401 and the pinch roller 402 are component elements of a first conveying unit located upstream in the conveyance direction of the print medium.

A platen 403 is provided at a printing position that faces a surface (ejection surface) on which an ejection port of an inkjet type printing head H is formed, and by supporting the rear surface of the printing medium P from below, the distance between the surface of the print medium P and the ejection surface of the printing head H is kept at a constant distance. The print medium P which is printed on the platen 403 is held between a discharging roller 405 and a rotating spur 406 which rotates following the discharging roller 405 and conveyed in the Y direction by rotation of the discharging roller 405, and then discharged to a discharge tray (not shown in the figure). The discharging roller 405 and the rotating spur 406 are component elements of a second conveying unit located downstream in the conveyance direction of the print medium.

The printing head H is removably mounted in a carriage 408 such that the ejection port surface faces the platen 403 or the print medium P. The carriage 408 is moved back-and-forth in the X direction along two guide rails 409, 410 by the driving force of a carriage motor E0001, and during this movement process the printing head H executes the ejecting operation according to a print signal. The X direction in which the carriage 408 moves is a direction that crosses the Y direction in which the print medium is conveyed, and is called a main scanning direction. On the other hand, the Y direction in which the print medium is conveyed is called a sub scanning direction. An image is formed on the print medium P in a stepwise manner by alternately repeating main scanning of the carriage 408 and the printing head H (movement that accompanies printing) and conveyance of the print medium (sub scanning).

Figure 2:
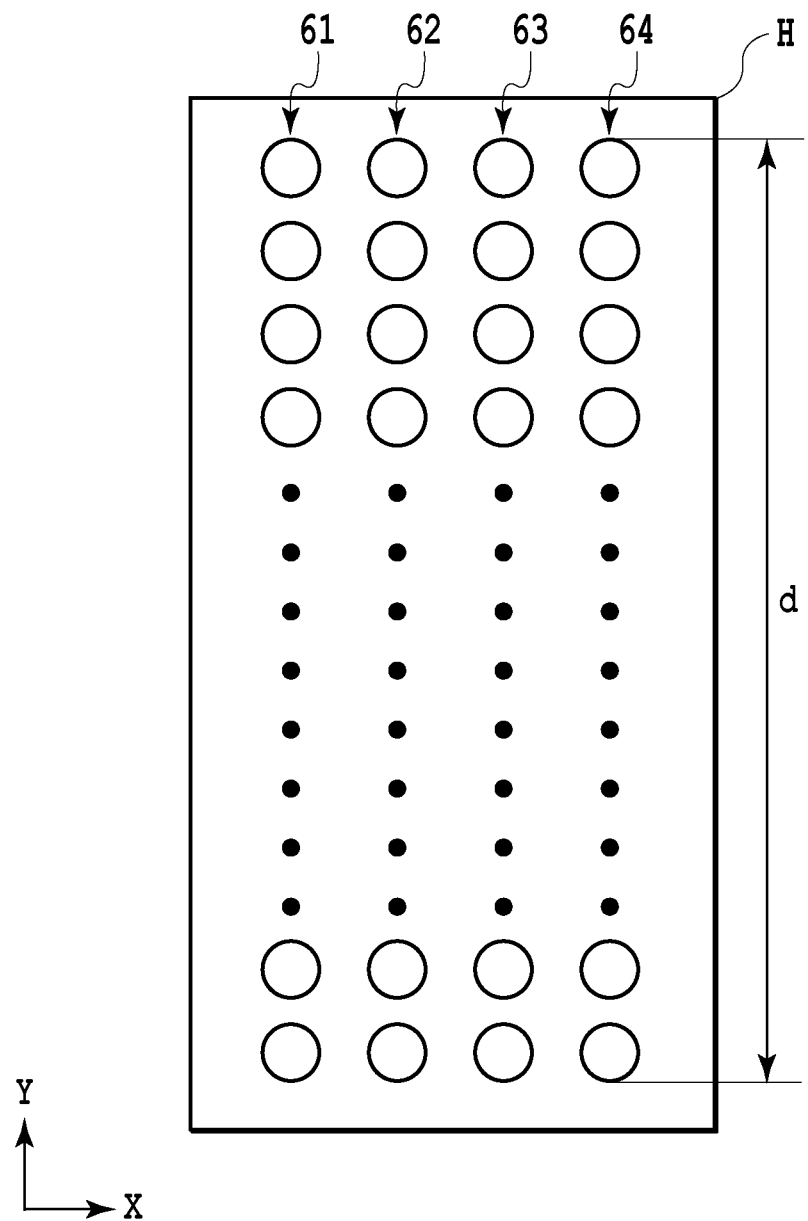
FIG. 2 is a schematic diagram of a printing head H as viewed from a surface on which an ejection port is formed.

FIG. 2 is a schematic diagram of the printing head H as viewed from the surface on which the ejection port is formed. In the present embodiment, a cyan printing element array 61, a magenta printing element array 62, a yellow printing element array 63, and a black printing element array 64 are arranged in a parallel arrangement in the X direction as shown in the figure. In each nozzle array, 1280 ejection ports for ejecting ink which is a printing material are arranged in the Y direction with certain pitches. The width of each nozzle array in the Y direction is d, and printing with the width d is possible in one scan.

Furthermore, the printing apparatus of this embodiment executes multi-pass printing, so printing scans are performed a plurality of times to form an image in a stepwise manner in an area that the printing head H can print in one printing scan. When doing this, by performing the conveying operation for an amount that is less than the width d of the printing head H between printing scans, it is possible to further reduce density unevenness and stripes caused by variation of individual nozzles.

Figure 3:
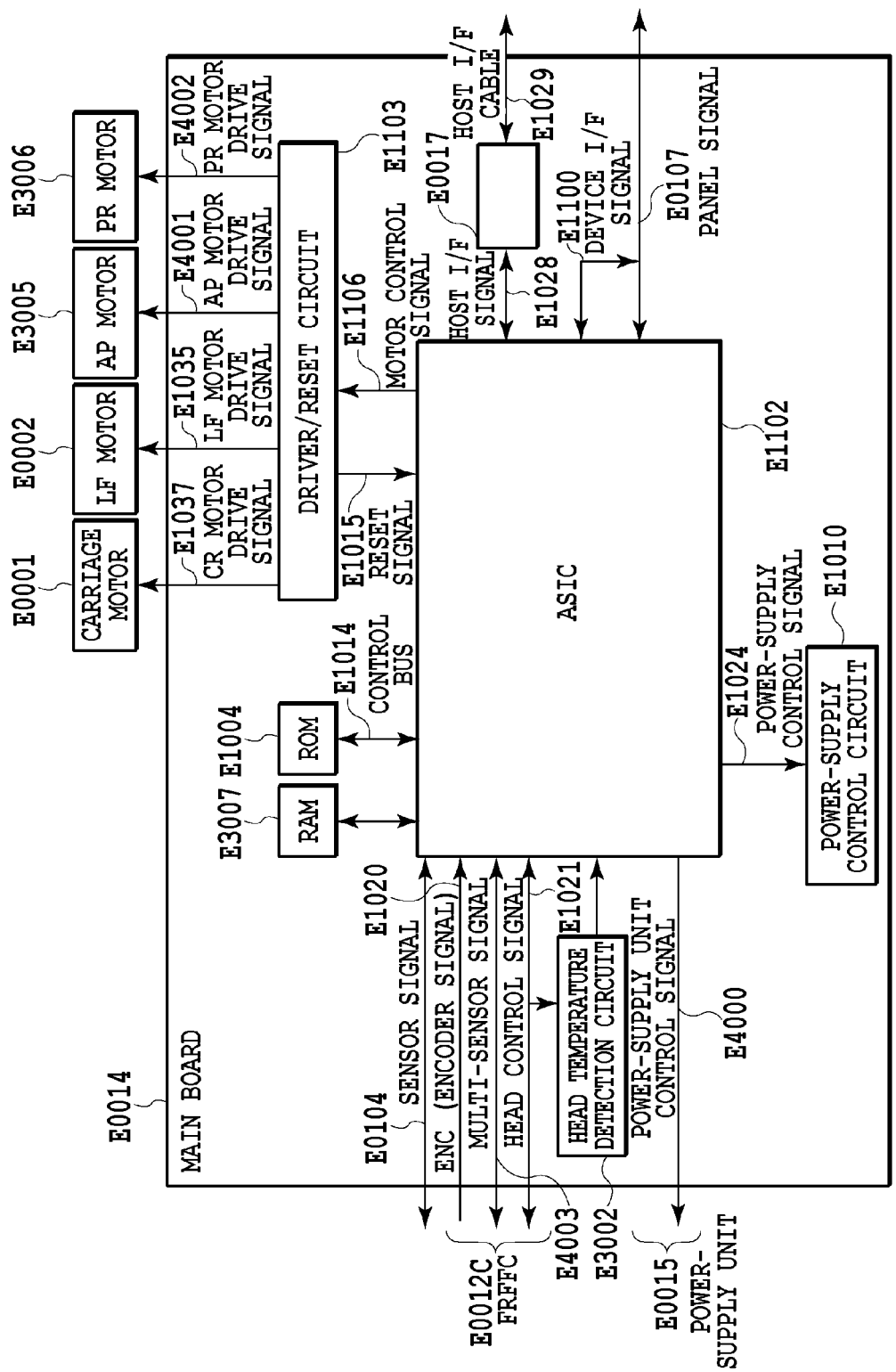
FIG. 3 is a block diagram showing the internal configuration of a printer engine.

FIG. 3 is a block diagram showing the internal configuration of a printer engine according to the present embodiment. A main board E0014 includes an ASIC E1102 which is an engine unit of an image formation apparatus. The ASIC E1102 reads a program stored in a ROM E1004 via a control bus E1014 and controls the entire apparatus according to the program. A DRAM E3007 is used as a data buffer for printing, a reception data buffer for the ASIC E1102 or host I/F signals E1028, or the like and is also used as a work area necessary for various control operations.

For example, the ASIC E1102 transmits or receives sensor signals E0104 or multi-sensor signals E4003 to or from various sensors or multi-sensors. Further, the ASIC E1102 detects an encoder signal E1020 for managing the position of a carriage 408 in the main scanning direction or a panel signal E0107 output from a power key, a resume key, or the like in a panel provided in the exterior of the apparatus. Furthermore, the ASIC E1102 performs various logical operations, conditional judgments, and the like according to the state of data input from a host I/F E0017, controls each component element, and performs control for driving the inkjet printing apparatus.

A driver/reset circuit E1103 drives each motor according to a motor control signal E1106 from the engine unit ASIC E1102. More specifically, the driver/reset circuit E1103 generates a carriage motor drive signal E1037 and drives the carriage motor E0001. Further, the driver/reset circuit E1103 generates an LF motor drive signal E1035 and drives an LF motor E0002 for rotating a conveying roller 401 and a discharging roller 405. Furthermore, the driver/reset circuit E1103 generates an AP motor drive signal E4001 and drives an AP motor E3005 for performing a suction-based recovery operation for the printing head. Moreover, the driver/reset circuit E1103 generates a PR motor drive signal E4002 and drives a PR motor E3006. The driver/reset circuit E1103 of the present embodiment has a power circuit and supplies necessary power to the main board E0014, a carriage board mounted in the carriage 408, a front panel provided in the exterior of the apparatus, and the like. Further, the driver/reset circuit E1103 detects a drop in power-supply voltage, and generates a reset signal E1015 and performs reset.

A power-supply control circuit E1010 controls the power supply to each sensor having optical elements according to a power-supply control signal E1024 from the ASIC E1102.

The host I/F E0017 sends the host I/F signals E1028 from the ASIC E1102 to a host I/F cable E1029 which is connected to the outside, and sends signals from the cable E1029 to the ASIC E1102.

Necessary power is supplied from a power-supply unit E0015, and as necessary, undergoes voltage conversion and is supplied to each of the units inside and outside of the main board E0014. The ASIC E1102 is connected to the power-supply unit E0015 via a power-supply unit control signal E4000, and controls the low-power consumption mode of the printing apparatus.

When performing the printing operation, the ASIC E1102 detects an encoder signal (ENC) E1020, generates a timing signal, interfaces with the printing head H by using a head control signal E1021, and controls the ejection operation. The encoder signal (ENC) E1020 and the head control signal E1021 are transmitted or received to or from the carriage board mounted in the carriage 408 via a flexible flat cable E0012. The head control signal E1021 is supplied to the printing head H via a head drive voltage modulation circuit and a head connector (not shown in the figure), and various information from the printing head H is sent to the ASIC E1102 via the flexible flat cable E0012. Of this information, temperature information for the printing head H is amplified by a head temperature detection circuit E3002 on the main board E0014, after which it is input to the ASIC E1102 and used for determining various control.

Figure 4:
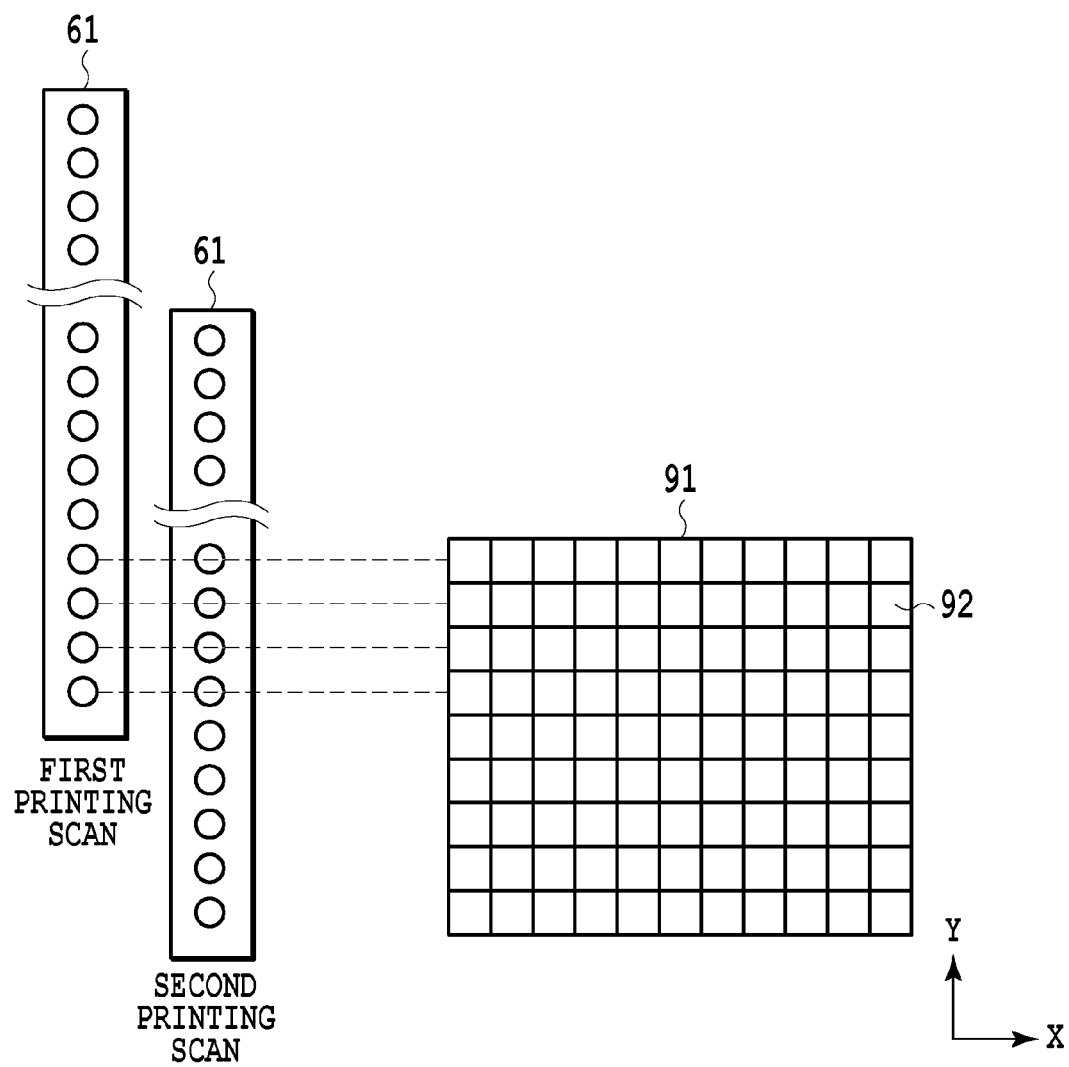
FIG. 4 is a diagram for explaining a printing method for performing 2-pass multi-pass printing.

FIG. 4 is a diagram for explaining a printing method for performing 2-pass multi-pass printing. In the 2-pass multi-pass printing, the same image area on a print medium is printed by two printing scans of the printing head H, that is, a first printing scan and a second printing scan.

For the sake of simplicity, only a cyan printing element array 61 is shown in the figure. An image area 91 in the print medium is constituted by a plurality of pixels arranged in the main scanning direction (X direction) and the sub scanning direction (Y direction). In each pixel 92, a dot is printed by ejecting ink from one printing element arranged in the printing element array 61. The printing element array 61 performs the first printing scan and the second printing scan of the image area 91 and a dot can be printed on each pixel by the two printing scans. A conveying operation for a predetermined amount is performed between the first printing scan and the second printing scan, and a relative-position relationship between the image area 91 and the nozzle array 61 is different between the first printing scan and the second printing scan as shown in the figure. More specifically, the image area 91 is printed by overlapping a group of dots printed by first relative movement of the print medium and the printing head (first printing scan) and a group of dots printed by second relative movement of the print medium and the printing head (second printing scan).

Figure 5:
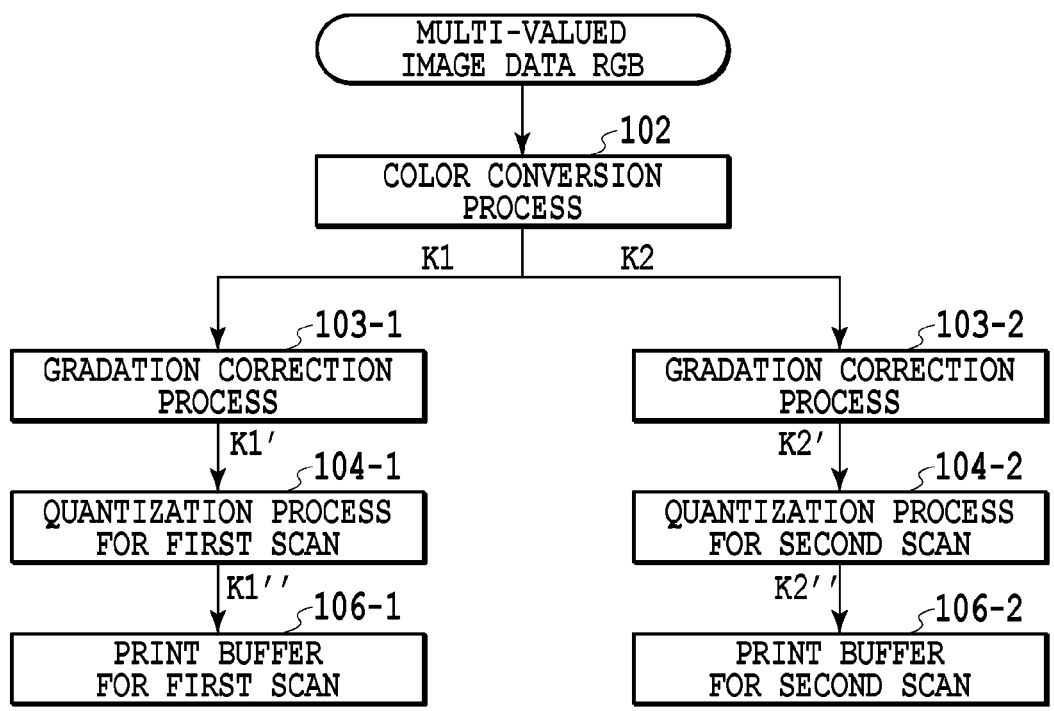
FIG. 5 is a block diagram for explaining a process for converting image data.

FIG. 5 is a block diagram for explaining a process for converting image data by the ASIC E1102 of the present embodiment. Input image data received via the host I/F cable E1029 is multi-valued RGB data, and is converted by a color conversion process 102 into multi-valued image data CMYK corresponding to inks used by the printing apparatus 2 and divided into two pieces corresponding to the two printing scans. Regarding specific processing, multi-valued RGB data is converted into first multi-valued data C1, M1, Y1, and K1 for the first scan and second multi-valued data C2, M2, Y2, and K2 for the second scan by referring to a three-dimensional lookup table which is prepared beforehand.

For the sake of simplicity, the steps for black data (K1 and K2) will be explained below. The first multi-valued black data K1 and the second multi-valued black data K2 are respectively subjected to a gradation correction process 103-1 for the first scan and a gradation correction process 103-2 for the second scan, and converted into multi-valued data K1' and K2'. In a gradation correction process, correction is made so that there is a linear relationship between an input signal and density expressed on the print medium. Normally, a gradation correction process is performed by referring to a one-dimension lookup table which is prepared beforehand.

The multi-valued black data K1' after gradation correction and the multi-valued black data K2' after gradation correction are respectively subjected to a quantization process 104-1 for the first scan and a quantization process 104-2 for the second scan and converted into black binary data K1" for the first scan and black binary data K2" for the second scan.

Japanese Patent Laid-Open Nos. 2000-103088 and 2011-000801 adopt an error diffusion method as a quantization process (a gradation reduction process). However, the present invention adopts a dither method. Specifically, multi-valued data for each pixel is converted into gradation reduced data of printing (1) or non-printing (0) by referring to a dither pattern in which a threshold is determined beforehand for each pixel. More specifically, in a case where the multi-valued data K1' or K2' is larger than a threshold for a corresponding pixel, the multi-valued data is converted into printing (1), and in a case where the multi-valued data K1' or K2' is equal to or smaller than the threshold, the multi-valued data is converted into printing (0). In this regard, the present invention provides different dither patterns for the quantization process 104-1 for the first scan and the quantization process 104-2 for the second scan. The details of the dither patterns will be explained later.

Then, the black binary data K1" for the first scan is stored in a print buffer 106-1 for the first scan and printed by a black nozzle array 64 of the printing head H during the first printing scan for the same image area. On the other hand, the black binary data K2" for the second scan is stored in a print buffer 106-2 for the second scan and printed by the black nozzle array 64 of the printing head H during the second printing scan for the same image area.

In the present embodiment, a first dither pattern is referred to in the quantization process 104-1 for the first scan and a second dither pattern different from the first dither pattern is referred to in the quantization process 104-2 for the second scan. Accordingly, even in a case where the multi-valued data K1' for a target pixel is equal to the multi-valued data K2' for the target pixel, a threshold for the first scan and a threshold for the second scan which are compared with the above multi-valued data are different from each other. Accordingly, the result of printing (1) or non-printing (0) for the target pixel is not necessarily the same both in the case of the first scan and in the case of the second scan. As a result, in the same image area, a pixel in which a dot is printed only by the first printing scan, a pixel in which a dot is printed only by the second printing scan, a pixel in which a dot is printed by both the first printing scan and the second printing scan, and a pixel in which a dot is not printed by either of the printing scans exist in a mixed manner.

Figure 6A:
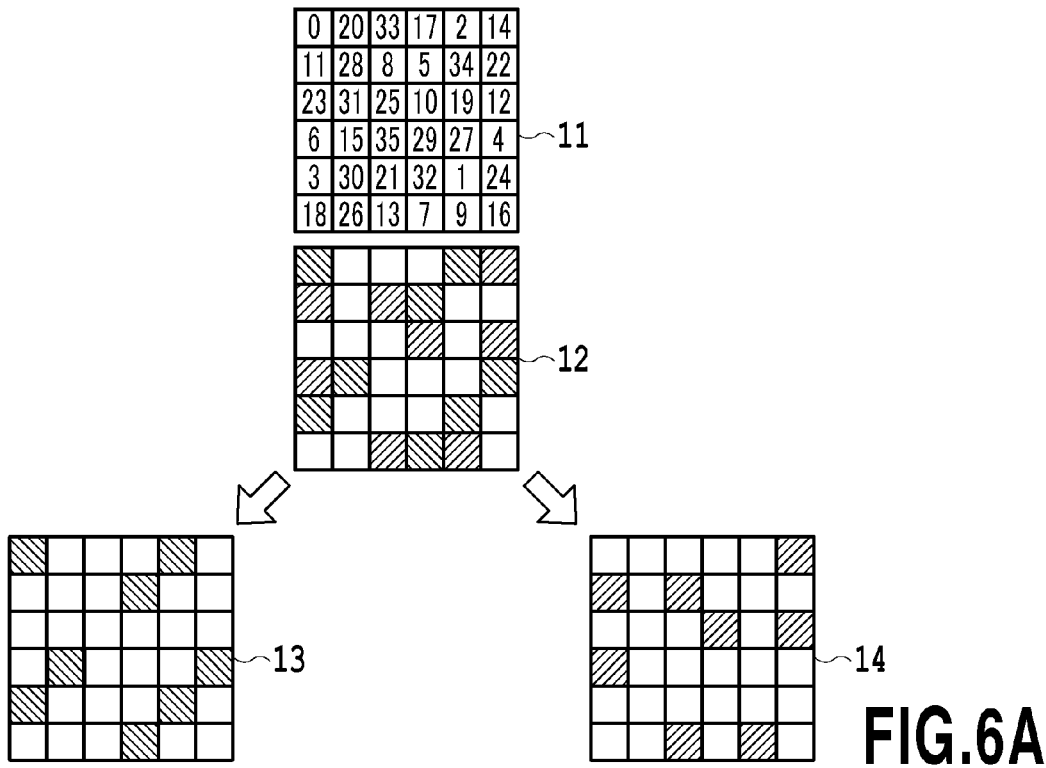
FIGS. 6A and 6B are schematic diagrams for explaining the result of quantization by a dither method.
Figure 6B:
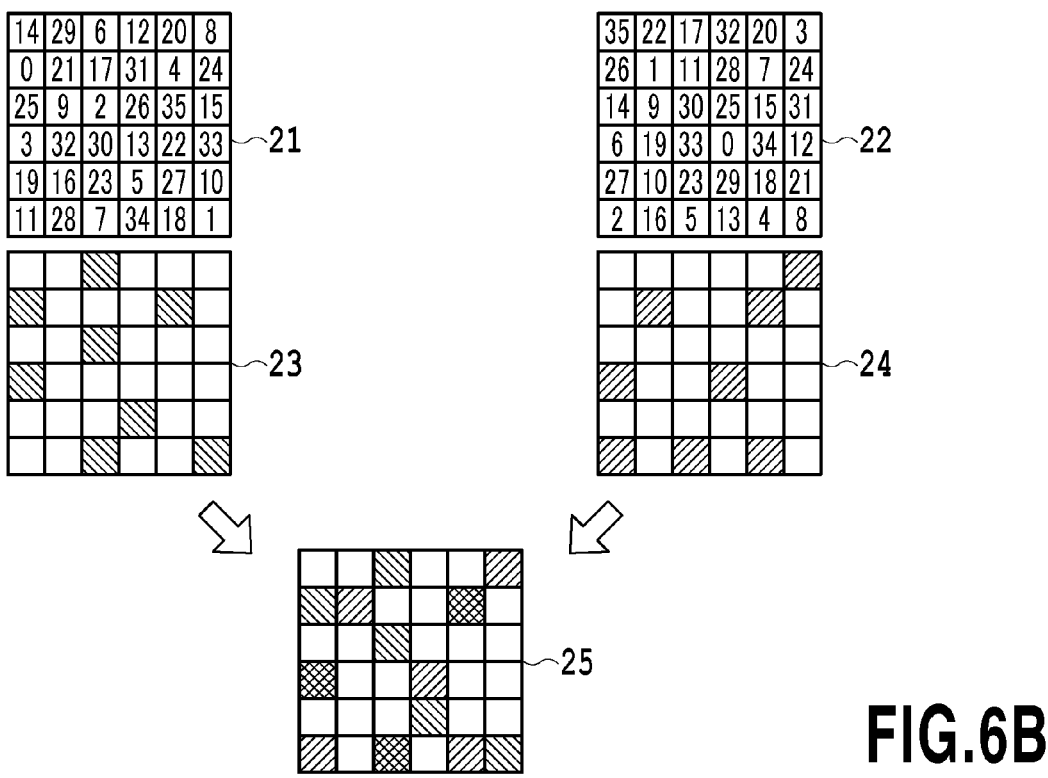

FIGS. 6A and 6B are schematic diagrams for specifically explaining the result of quantization in the present embodiment as compared with a conventional method.

FIG. 6A shows a conventional method, and shows an example in which after binary data 12 is generated by using a dither pattern 11, binary data 13 for the first scan and binary data 14 for the second scan are generated by using two mask patterns having a complementary relationship. For the sake of simplicity, an area of a dither pattern of 6 pixels×6 pixels is shown as a unit area.

In the dither pattern 11 of 6 pixels×6 pixels, a threshold of 0 to 35 is set to each pixel. In a case where the multi-valued data "16" is input to all 36 pixels, printing (1) is set to only pixels whose set threshold is smaller than "16," that is, a number of 0 to 15, and these pixels correspond to shaded pixels in the binary data 12 in the figure. Conventionally, these specified printing pixels are distributed to the binary data 13 for the first printing scan and the binary data 14 for the second printing scan by using mask patterns having a complementary relationship. As a result, the binary data 13 for the first printing scan and the binary data 14 for the second printing scan have an exclusive relationship, and accordingly, there is no pixel printed by both of the two printing scans.

On the other hand, FIG. 6B shows a method for generating print pixels in the present embodiment. In the present embodiment, two pieces of the multi-valued data output from a color conversion process are subjected to quantization processes based on a first dither pattern 21 and a second dither pattern 22. In a case where the multi-valued data "16" which is the same as the multi-valued data used in FIG. 6A is processed, in the color conversion process of the present embodiment, multi-valued data "8" obtained by dividing "16" by two is output to each pixel as the multi-valued data for the first scan and the second scan. In the quantization processes, printing (1) is set to pixels whose set threshold is lower than "8," that is, a number of 0 to 7, based on the multi-valued data "8." In the present embodiment, the dither pattern 21 for the first scan and the dither pattern 22 for the second scan have different arrangements of thresholds, and even in a case where the same multi-valued data "8" is input, the binary data 23 for the first scan and the binary data 24 for the second scan have the different positions of print pixels. Further, the dither pattern 21 for the first scan and the dither pattern 22 for the second scan of the present embodiment do not have an exclusive relationship because pixels having the same threshold can be positioned in the same position. Accordingly, in data 25 in which the binary data 23 is superimposed on the binary data 24, there are some pixels (pixels expressed by grid patterns) printed by both of the two printing scans.

In a case where a different dither pattern is prepared for each printing scan, it is possible to realize dot arrangements adapted for various purposes by imparting special characteristics to the dither patterns. In the present embodiment, the number of overlapping dots printed by the first scan and the second scan and the dispersion of dots are adjusted, thereby preparing the two dither patterns related to each other to print an image whose graininess and density variation are not likely to be observed in an entire gradation range.

Figure 7:
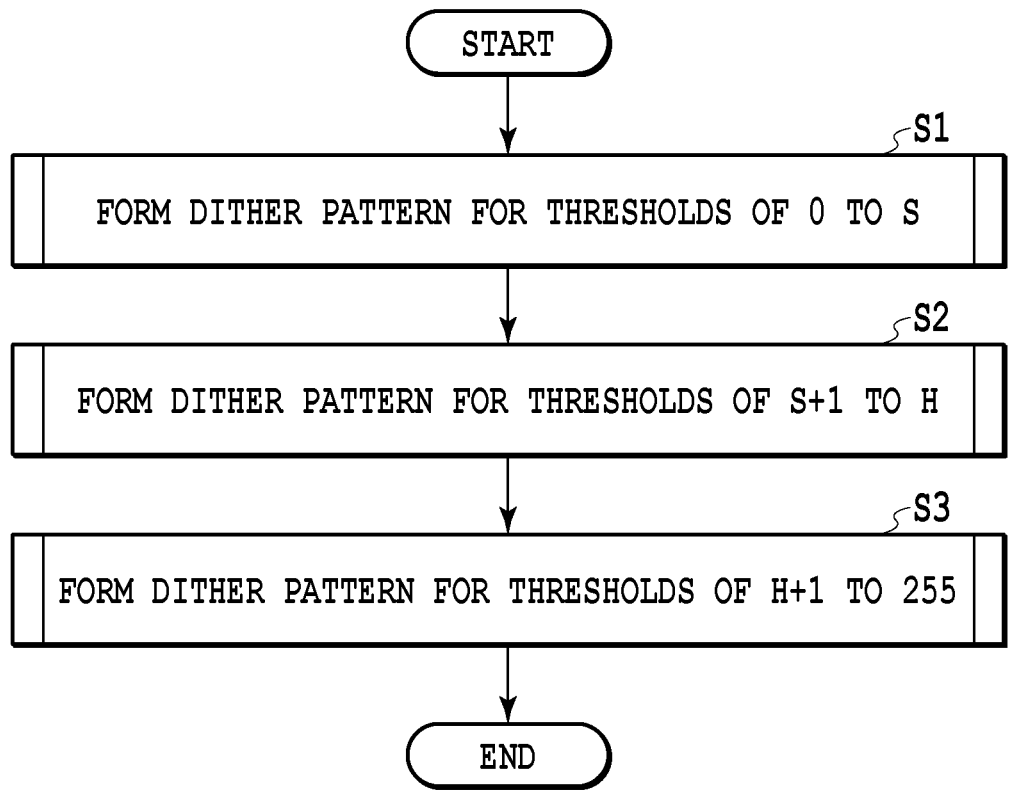
FIG. 7 is a flowchart for explaining a method for forming dither patterns used in the present invention.

FIG. 7 is a flowchart for explaining a method for forming dither patterns for the first scan and the second scan used in the present embodiment. In the present embodiment, the multi-valued data K1' and the multi-valued data K2' output from a gradation correction process have a 256-step gradation, and data input to each pixel is a number of 0 to 255. A threshold set to each pixel in the dither patterns is a number of 0 to 255. During a scan, a dot is printed on a pixel having input data which is larger than the set threshold. In the present embodiment, the size of a dither pattern is 16 pixels×16 pixels, and a threshold of 0 to 255 which is a natural number is set to each pixel in the dither pattern.

With reference to FIG. 7, in the present embodiment, the threshold of 0 to 255 is set in three steps. Step S1 is an initial step for setting the thresholds, in which low-level thresholds (0 to S) are set to a dither pattern of 16 pixels×16 pixels. A pixel to which a low-level threshold of 0 to S is set is a pixel on which a dot is printed even with low gradation data. Accordingly, in the present embodiment, in order to arrange dots with as high dispersion as possible, thresholds of 0 to S are set to pixels having such a positional relationship. As a result, the number of overlapping dots is zero in the case of an image in which the gradation value of input image data is a number of 0 to S.

In subsequent step S2, intermediate-level thresholds (S+1 to H) are set. A pixel to which an intermediate-level threshold of S+1 to H is set is a pixel on which a dot is printed with intermediate gradation data or high gradation data. In a situation in which a dot is printed on the above pixel, a dot is also printed on a pixel of a low gradation level threshold which is positioned around the above pixel, and a print medium includes some overlapping pixels on which a dot is printed a plurality of times. This intermediate gradation region is a gradation region in which the coverage of dots and image density are most likely to change because of printing position displacement. In the present embodiment, in order to reduce density variation caused by printing position displacement, a threshold of S+1 to H is set to suitably adjust the number of overlapping dots.

In step S3, a high-level threshold (H+1 to 255) is set to a pixel to which a threshold is not set in step S1 or S2. The pixel to which the high-level threshold of H+1 to 255 is set is a pixel on which a dot is printed with high gradation data. In such gradation in which a dot is printed on the above pixel, many dots are already printed on pixels around the above pixel, and there arise almost no problems with density variation or graininess that are caused by printing position displacement.

Figure 8A:
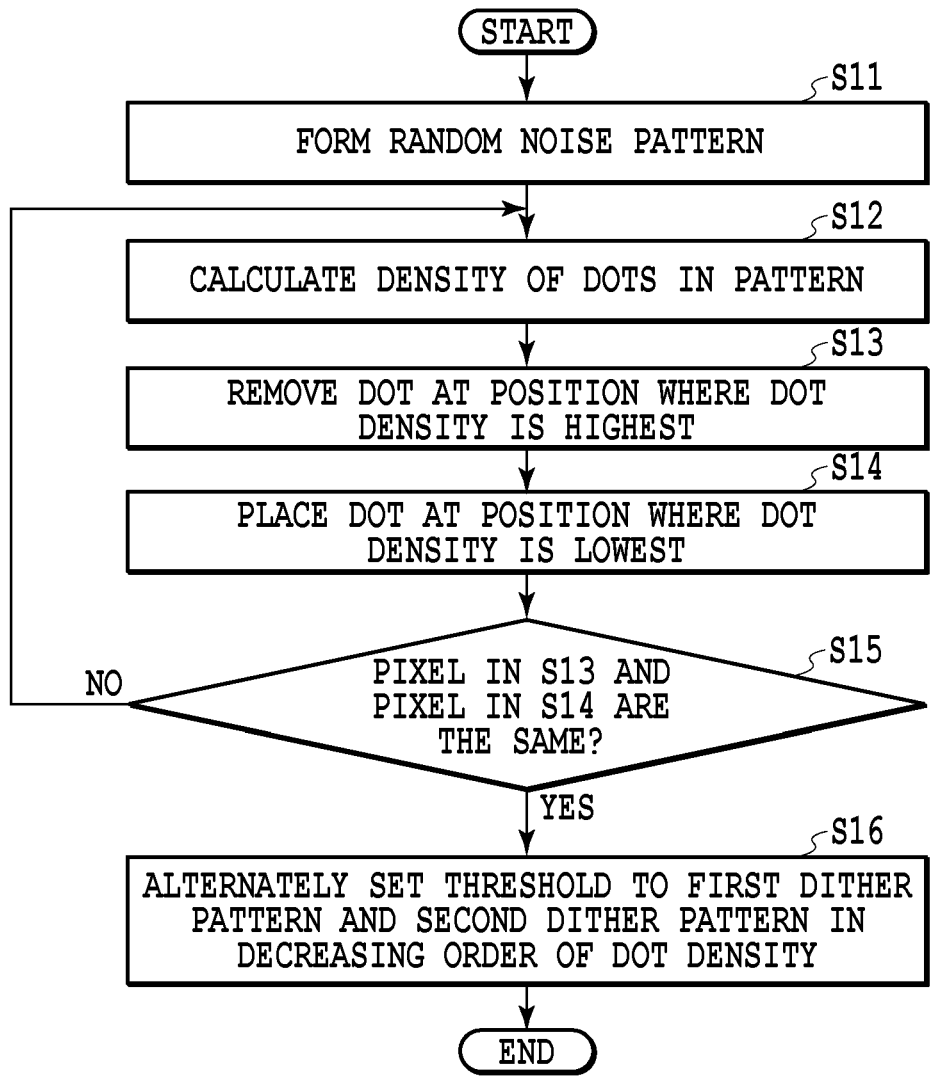
FIGS. 8A to 8C are flowcharts for explaining a process for setting a threshold.
Figure 8B:
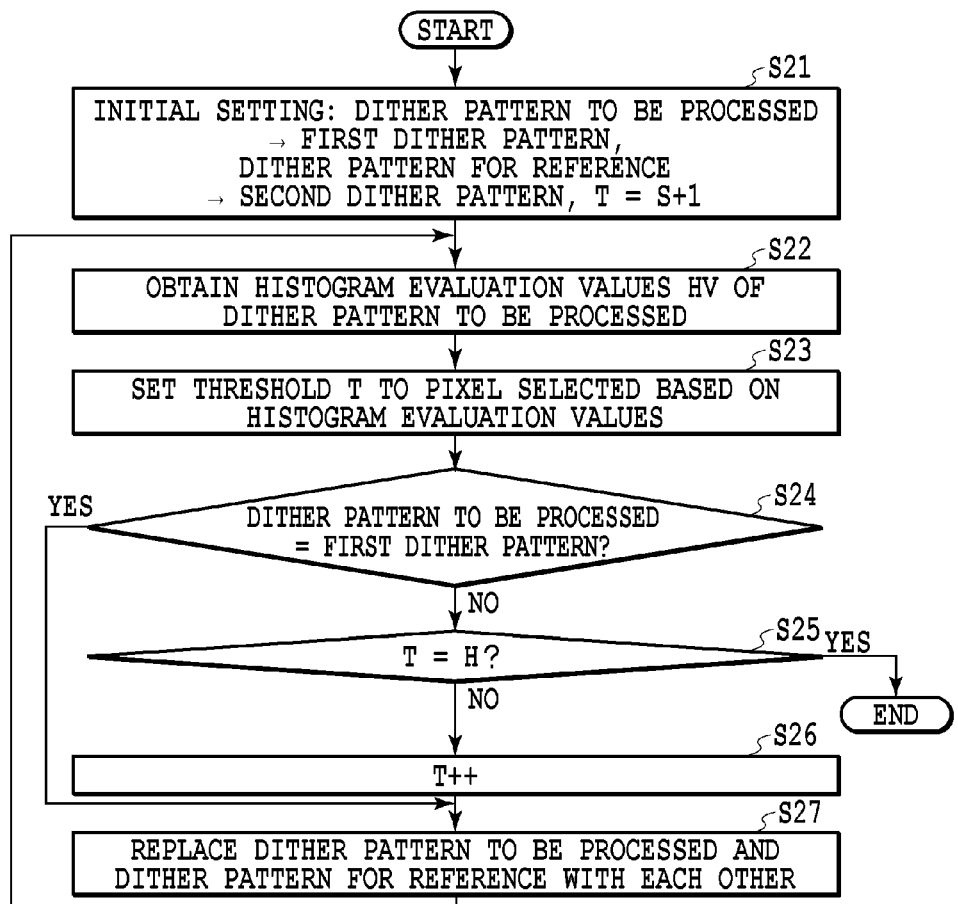
Figure 8C:
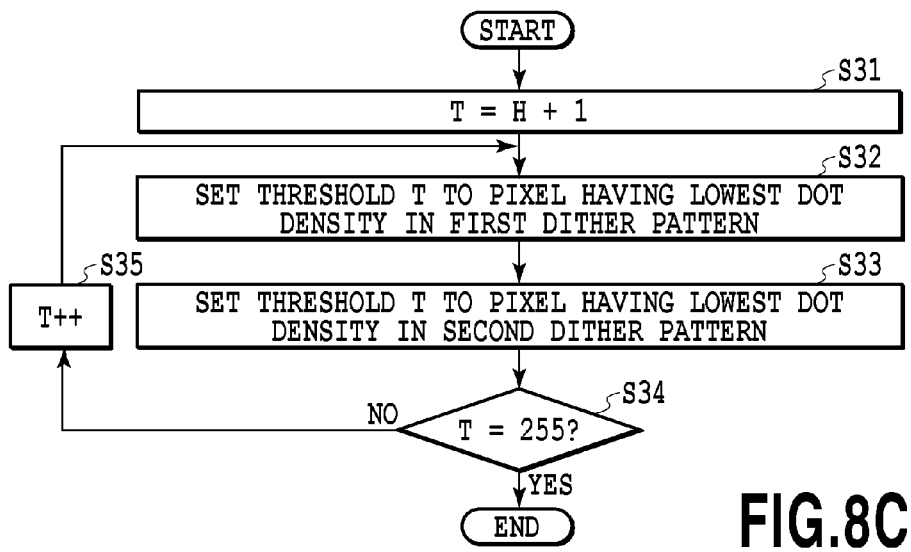

FIGS. 8A to 8C are flowcharts for explaining a process for setting a threshold in steps S1 to S3 above. FIG. 8A is a flowchart for explaining a process for setting a low-level threshold (0 to S) to a dither pattern in step S1 of FIG. 7.

When this process is started, firstly, (2×(S+1)) dots are randomly set to 16 pixels×16 pixels in step S11. As stated above, a low-level threshold is set so that dots are sufficiently separated from each other with high dispersion. Accordingly, it is desirable to set the upper limit S of the low-level threshold at a value such that the above state can be maintained.

Steps S12 to S15 are steps for enhancing the dispersion of a dot arrangement created in step S11. Firstly, in step S12, the Gauss filter values of all pixels are obtained by using a Gauss filter of 3×3, for example. In step S13, a dot whose position has the highest Gauss filter value, in other words, a dot whose position is determined to have the highest concentration level of dot, is removed. Further, in step S14, a dot is placed at a position which has the lowest Gauss filter value, that is, a position which is determined to have the lowest concentration level of dot. Incidentally, the Gauss filter is used as a device for expressing dot concentration level, but a low-pass filter (LPF) or the like can also be used as long as it is a parameter capable of expressing dot concentration level.

In step S15, it is determined whether or not the position where the dot is removed in step S13 is the same as the position where the dot is placed in step S14. In a case where it is determined that the above positions are the same, the process proceeds to step S16. On the other hand, in a case where it is determined that the above positions are not the same, it is determined that the dispersion of dots is not sufficient, and the process returns to step S12 and steps S12 to S15 are repeated.

In step S16, a Gauss filter value is obtained for a dot position created in steps S12 to S15 by using a Gauss filter. Then, a threshold of 0 to S is alternately set to pixels in the dither pattern for the first scan and pixels in the dither pattern for the second scan in decreasing order of the Gauss filter value of a pixel (firstly a threshold is set to a pixel whose position "has the highest dot concentration level"). Since the number of dots is (2×(S+1)), a threshold of 0 to S is alternately set to each pixel of the dither patterns. Incidentally, a Gauss filter value may be obtained every time a threshold is set to each pixel. A pixel to which a threshold is set is removed from a dot arrangement, and a Gauss filter value is obtained for a dot arrangement after removal, and a next threshold is set to a pixel at a position having the highest Gauss filter value. This processing is repeated on all the pixels which is positioned a dot to set a threshold.

Figure 9:
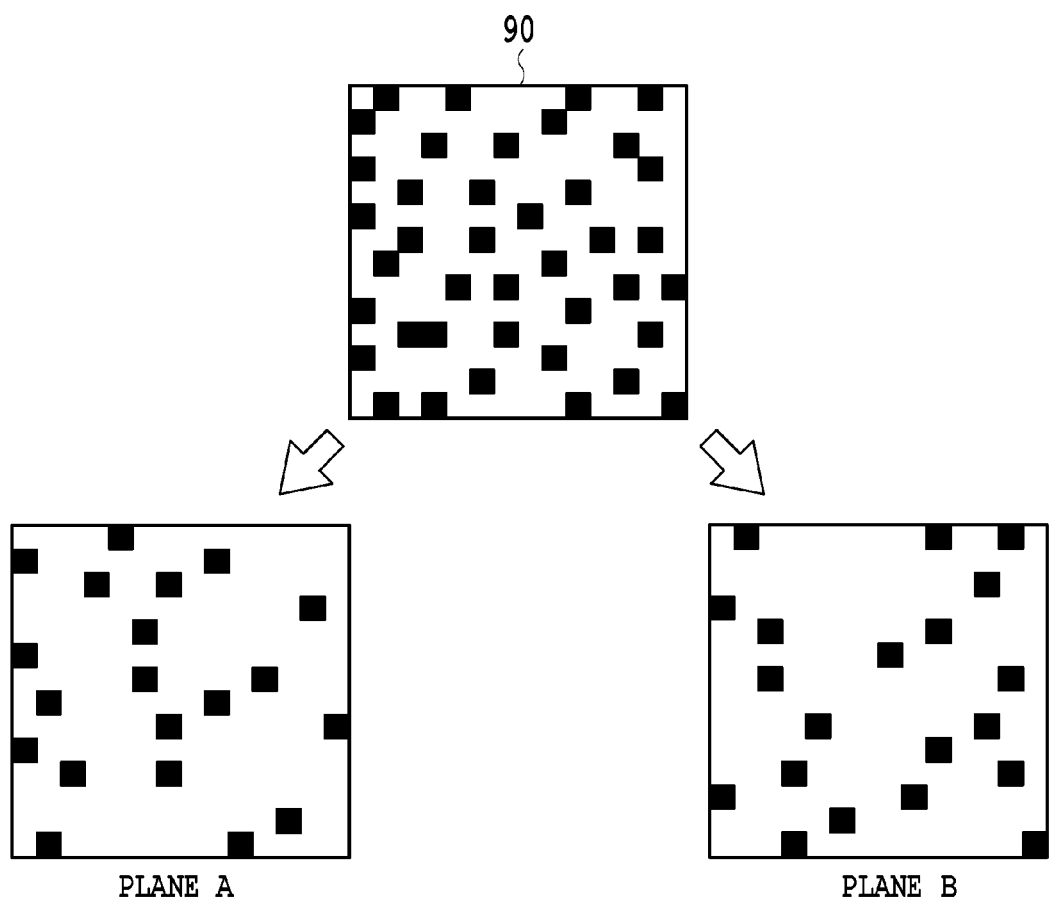
FIG. 9 is a diagram showing the threshold arrangement states of dither patterns for a first scan and a second scan.

FIG. 9 shows the threshold arrangement states of dither patterns for a first scan and a second scan to which thresholds are set in step S16. FIG. 9 shows a state in which S=19, and 40 (=2×(S+1)) dots of a pattern 90 arranged with high dispersion are divided into 20 pixels in a plane A for the first scan and 20 pixels in a plane B for the second scan.

After the above processing is performed, the process in FIG. 8A, that is, the process for setting a low-level threshold (0 to S) ends.

FIG. 8B is a flowchart for explaining a process for setting an intermediate-level threshold (S+1 to H) to a dither pattern in step S2 of FIG. 6. When this process is started, firstly, predetermined initial setting is performed in step S21. More specifically, the dither pattern for the first scan to which the thresholds of 0 to S are already set in step S1 is set as a dither pattern to be processed, and the dither pattern for the second scan is set as a dither pattern for reference. Next, a threshold T is set so that T=S+1.

In step S22, the histogram evaluation values HV of the dither pattern to be processed with respect to the dither pattern for reference are obtained (a first obtaining step). The histogram evaluation values show the distribution of directions in which pixels to which thresholds are set are successively arranged in the two dither patterns. The histogram evaluation values will be specifically explained below.

Figure 10:
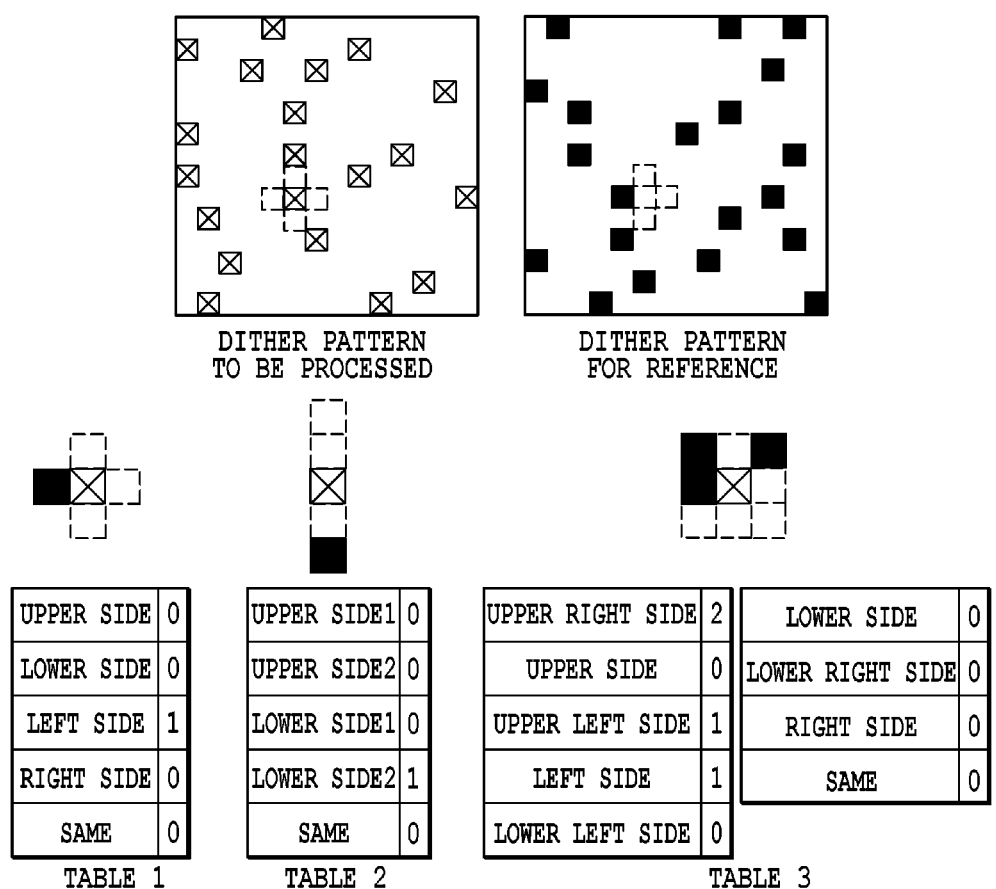
FIG. 10 is a diagram showing examples of histogram evaluation values.

FIG. 10 shows examples of histogram evaluation values. FIG. 10 shows three types of histograms of a dither pattern to be processed with respect to threshold-set pixels (print pixels) to which thresholds are set in a dither pattern for reference. In Table 1, for example, a certain pixel in the dither pattern to be processed is selected as a reference pixel, it is determined whether a pixel in the dither pattern for reference which is on the upper, lower, right or left side of and adjacent to a pixel corresponding to the reference pixel in the dither pattern to be processed, is a print pixel to which a threshold is set, and the number of print pixels is counted for each direction. For example, in a case where a pixel in the dither pattern for reference corresponding to a pixel which is on the upper side of and adjacent to the reference pixel in the dither pattern to be processed is a print pixel, one is added to a number in a column of "UPPER SIDE" in the table. Further, in a case where a pixel in the dither pattern for reference corresponding to a pixel which is on the right side of and adjacent to the reference pixel is a print pixel, one is added to a number in a column of "RIGHT SIDE" in the table. Further, in a case where a pixel in the dither pattern for reference which is at the same position as the reference pixel of the dither pattern to be processed is a print pixel, one is added to a number in a column of "SAME" in the table. The histogram evaluation values are obtained for all the pixels of the dither pattern to be processed with respect to the dither pattern for reference in the above manner, and the histogram evaluation values are summed for each direction, and the obtained results are called a histogram. The histogram is used as a list of the count of print pixels of the dither pattern for reference associated with a relative position with respect to a reference pixel of the dither pattern to be processed. In the present embodiment, as this histogram, not only the above first histogram (the dither pattern for the first scan with respect to the dither pattern for the second scan), but also a second histogram (the dither pattern for the second scan with respect to the dither pattern for the first scan) is prepared. Every time a threshold-set pixel (print pixel) is newly set, each histogram is updated.

In step S23 of FIG. 8B, out of pixels to which thresholds are not set yet in the dither pattern to be processed, one pixel is selected as a target pixel such that the distribution of the histogram becomes as uniform as possible, and the threshold T is set in the target pixel. For example, in a case where all numbers in the columns of "UPPER SIDE," "LOWER SIDE," "LEFT SIDE," and "SAME" are 2, and a number in the column of "RIGHT SIDE" is 1, a pixel in the dither pattern to be processed having a print pixel in the dither pattern for reference which is at the right side of and adjacent to the pixel in the dither pattern to be processed is determined as a pixel to which the threshold T is set in the dither pattern to be processed (a first determining step). In this regard, a threshold, that is a print pixel, only has to be preferentially set to a position such that the distribution of the histogram is substantially uniform. The smallest count in a column does not necessarily have to be increased.

In step S24, it is determined whether or not a current dither pattern to be processed is the dither pattern for the first scan (first dither pattern). In a case where the current dither pattern to be processed is the dither pattern for the first scan, the process proceeds to step S27. On the other hand, in a case where the current dither pattern to be processed is not the dither pattern for the first scan, but the dither pattern for the second scan (second dither pattern), the process proceeds to step S25, and it is determined whether or not the threshold T set in step S23 equals H (T=H). In a case where T=H, the process ends. In a case where T≠H, that is, T<H, the threshold T is incremented in step S26 in order to set a next threshold, and the process proceeds to step S27.

In step S27, setting of the dither pattern to be processed and setting of the dither pattern for reference for the dither pattern for the first scan and the dither pattern for the second scan are replaced with each other, and the process returns to step S22. Steps S22 to S27 are repeated, thereby successively performing the first obtaining step and the first determining step for the first dither pattern and the second obtaining step and the second determining step for the second dither pattern, thus setting print pixels in these dither patterns.

Figure 11:
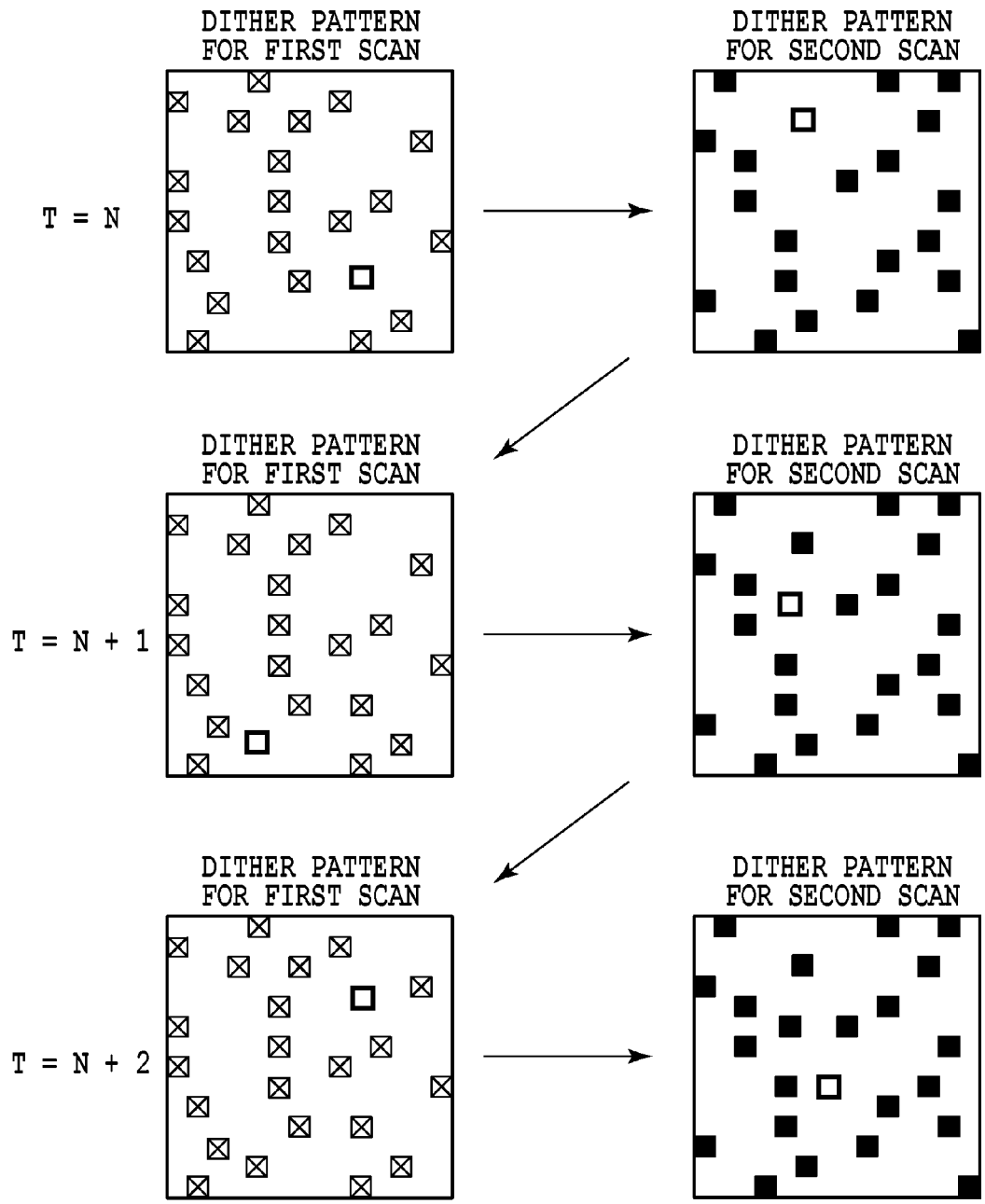
FIG. 11 is a diagram showing a manner in which print pixels are determined for two dither patterns.

FIG. 11 is a diagram showing a manner in which print pixels (threshold-set pixels) are alternately determined for a dither pattern for a first scan and a dither pattern for a second scan according to the flowchart of FIG. 8B. In the figure, an outlined square shows a pixel to which a threshold is to be newly set. In the two dither patterns, as the threshold T is changed in order such as N, N+1, N+2, print pixels are set one-by-one so that upper-, lower-, right-, and left-side adjacent positions are distributed as uniformly as possible.

FIG. 8C is a flowchart for explaining a process for setting a high-level threshold (H+1 to 255) to a dither pattern in step S3 of FIG. 7.

When this process is started, firstly, the threshold T is set in step S31 so that T=H+1.

In step S32, a pixel which "has the lowest dot concentration level" is selected from pixels to which thresholds are not set yet in the dither pattern for the first scan, and the threshold T is set to the selected pixel.

In step S33, a pixel which "has the lowest dot concentration level" is selected from pixels to which thresholds are not set yet in the dither pattern for the second scan, and the threshold T is set to the selected pixel.

In step S34, it is determined whether or not T=255. In a case where T<255, a threshold to be set remains, and accordingly, after the threshold T is incremented in step S35, the process returns to step S32. On the other hand, in a case where T=255 in step S34, it is assumed that setting of all the thresholds is completed, and the process ends. Incidentally, in the present embodiment, the thresholds for the dither matrixes are set in three steps S1 to S3. However, all the thresholds can be set in step S1 and S2 by setting H in step S2 so that H=255.

The two dither patterns formed by the above-explained method so that they are associated with each other can be used for the quantization process 104-1 for the first scan and the quantization process 104-2 for the second scan shown in FIG. 5. High dispersion can be obtained in a low gradation region whose image density is low by performing 2-pass multi-pass printing based on binary data quantized by using these dither patterns. Further, it is possible to output an image in which density variation caused by printing position displacement can be suppressed in an intermediate gradation region or a high gradation region whose image density is high.

With reference to FIG. 10, again, the histogram in Table 1 explained based on the above examples is obtained by counting the number of print pixels which are adjacent in an upper, lower, right, or left direction. This histogram is useful in a case where printing position displacement is likely to occur evenly in upper, lower, left, and right directions. More specifically, whichever direction printing position displacement occurs in, the number of overlapping dots which are to be separated can be controlled to be close to the number of adjacent dots which are to overlap.

Further, in a case where printing position displacement is likely to occur mainly in a conveyance direction (upper and lower directions), a histogram is useful which is obtained by counting two pixels which are successively adjacent in the upper and lower directions as shown in Table 2. Further, in a case where printing position displacement is likely to occur in all directions including an oblique direction, it is possible to count for a 3×3 pixel area with a print pixel in the center as shown in Table 3. Furthermore, it is also possible to weight each count according to a direction of displacement and an amount of displacement and set the threshold T to a pixel such that each weighted count is on as similar a level as possible. In any case, a histogram for an appropriate area only has to be prepared according to a direction and an amount of printing position displacement of a printing apparatus. Moreover, there is a case where the above printing position displacement varies depending on the type of print medium, a printing mode, and the like. In a case where a histogram for each mode is prepared, and a plurality of dither patterns are formed based on the histogram and stored beforehand in a storage device, a quantization process can be performed by using an optimum dither pattern in any printing mode.

Figure 12:
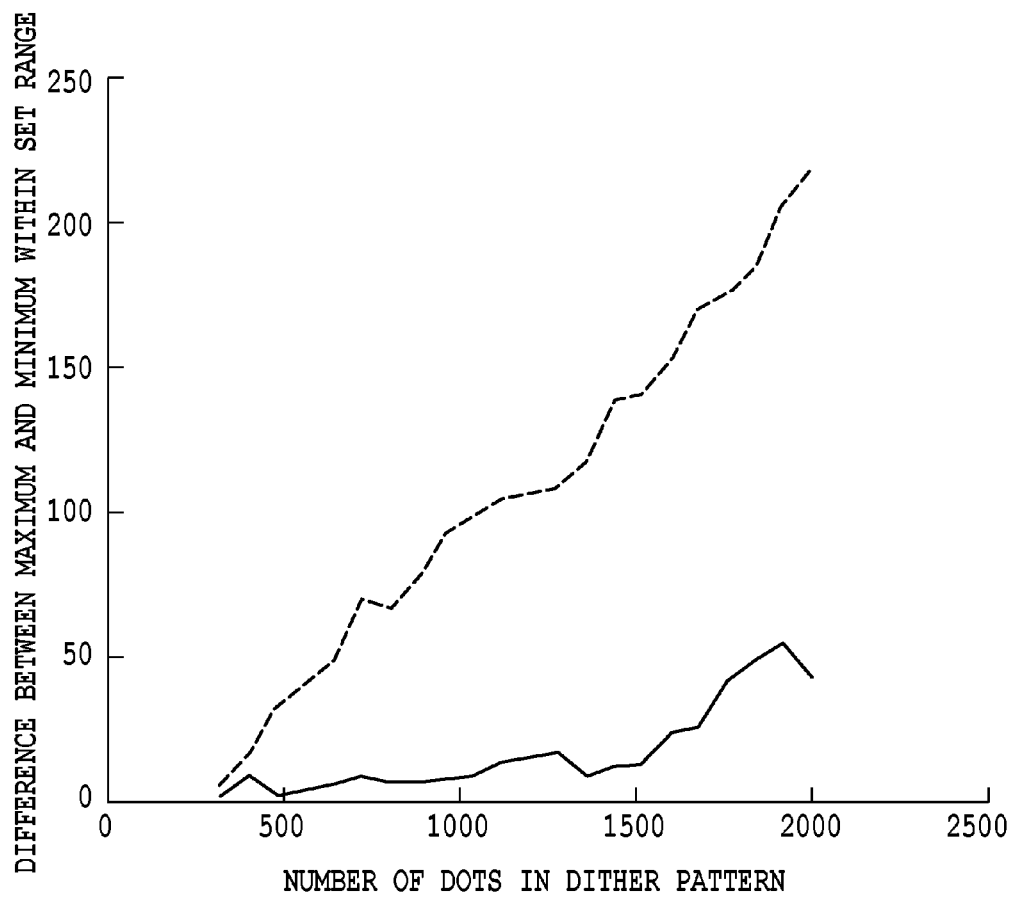
FIG. 12 is a graph for comparing the deviation of a histogram between the present invention and a conventional example.

FIG. 12 is a graph for comparing the deviation of a histogram between a case where print pixels in two dither patterns are set to a 64×64 pixel area by using the histogram shown in Table 1 and a case where the print pixels are set without correlation. A horizontal axis shows the number of print pixels in the 64×64 pixel area, and a vertical axis shows a difference between a maximum and a minimum of the counts in the histogram. A large difference between the maximum and the minimum means that the deviation of the histogram is large.

In a case where two dither patterns are formed without correlation, the difference between the maximum and the minimum is about 10% of all the number of pixels as shown by a dashed line of the figure. In a case where the difference of this level arises, graininess is visually recognized occasionally, depending on an ink color. In a case where two dither patterns are formed to minimize the deviation of the histogram as in the present embodiment, the difference between the maximum and the minimum can be suppressed to below 10% of the number of all the pixels as shown by a solid line of the figure. Accordingly, in any ink color, the difference can be suppressed to the extent that graininess is not visually recognized.

Advantages achieved by adopting the present embodiment will be specifically explained below.

Figure 13:
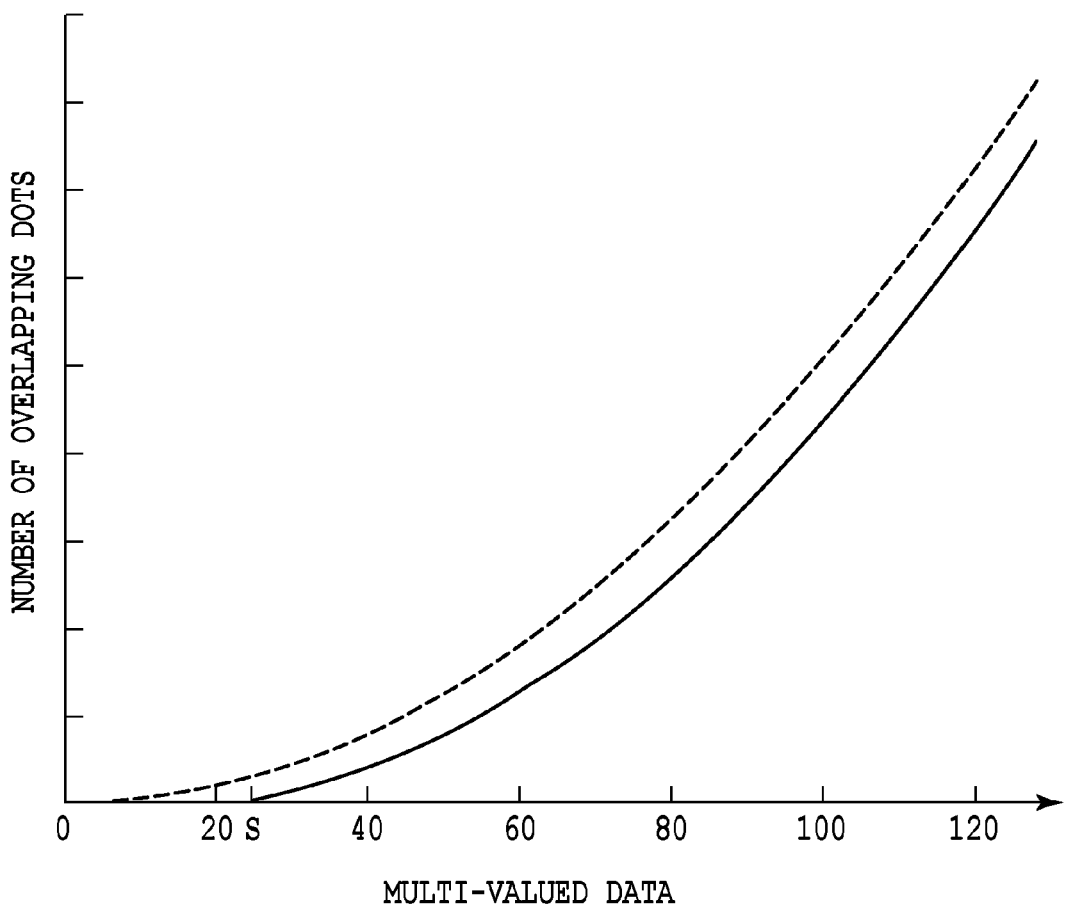
FIG. 13 is a graph for comparing the number of overlapping dots for input multi-valued data between the present invention and a conventional example.

FIG. 13 is a graph for comparing the number of overlapping dots for input multi-valued data between the present embodiment and a conventional example disclosed in Japanese Patent Laid-Open Nos. 2000-103088 and 2011-000801 in which two error diffusion methods are performed in parallel without correlation. In the figure, a horizontal axis shows a signal value (0 to 255) of multi-valued data before division, and a vertical axis shows the number of dots (overlapping dots) printed by both the first printing scan and the second printing scan in a predetermined area.

In Japanese Patent Laid-Open Nos. 2000-103088 and 2011-000801, multi-valued data is divided into pieces corresponding to the first scan and the second scan and subjected to error diffusion methods without correlation. Accordingly, the probability R that printing "1" is set for both of the first printing scan and the second printing scan is represented by the following equation:

$$R=(N1 \times N2)/(M \times N)$$

where N1 is the number of pixels in M×N pixels to which printing "1" is set for the first printing scan, and N2 is the number of pixels in the same area to which printing "1" is set for the second printing scan. In a case where the distribution ratio between the multi-valued data for the first printing scan and the multi-valued data for the second printing scan is 1:1, N1 and N2 are almost equal, and the number of overlapping dots in the predetermined area is represented by a dashed line in the figure. As seen from the figure, in the inventions of Japanese Patent Laid-Open Nos. 2000-103088 and 2011-000801, overlapping dots exist even in a region in which an input signal value is very low, and there is a concern of worsening of graininess.

On the other hand, a solid line in the figure shows the number of overlapping dots in the case of performing a binarization process by using a dither pattern of the present embodiment. In the present embodiment, a dither pattern in which an overlapping dot is not generated in a low gradation region is prepared in step S1 of FIG. 7, and accordingly, the number of overlapping dots is kept at zero in a region in which an input signal value is low, and gradually increases in a region where the signal value exceeds 20. In an intermediate gradation region, two dither patterns have a correlation, and the dispersion is kept as high as possible, and accordingly, dots do not overlap at the probability R simply represented by the above equation. The number of overlapping dots is kept smaller than in Japanese Patent Laid-Open Nos. 2000-103088 and 2011-000801.

Figure 14A:
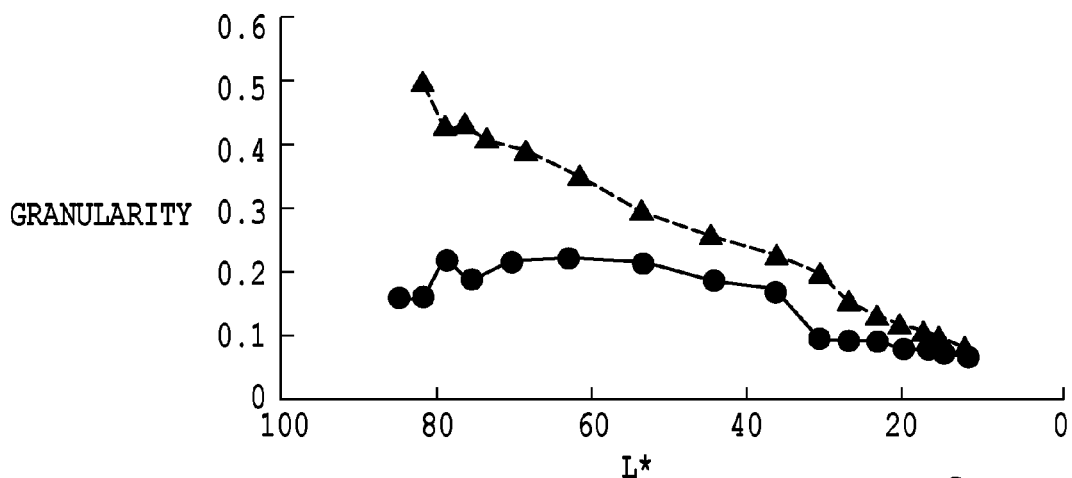
FIGS. 14A to 14C are graphs showing the effects of dither patterns of the present invention on granularity.
Figure 14B:
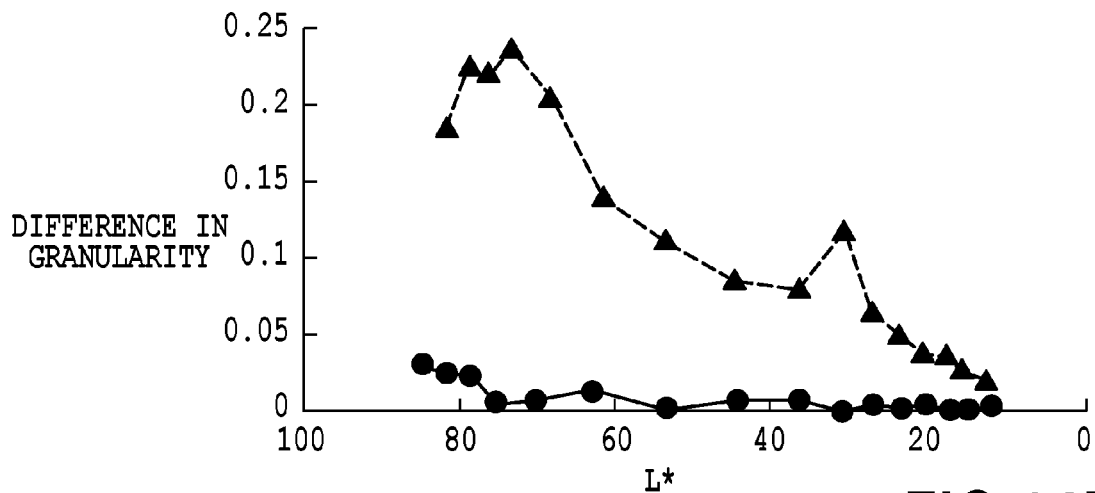
Figure 14C:
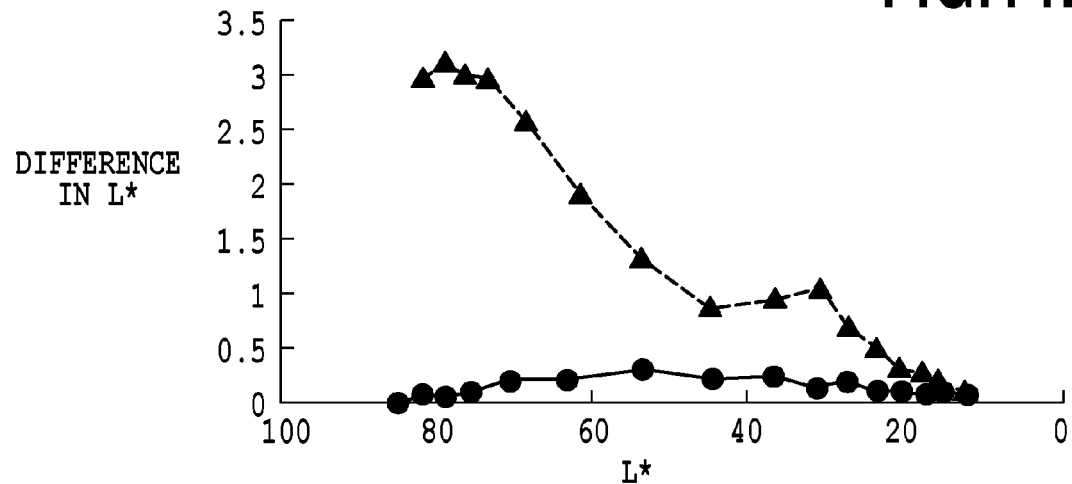

FIGS. 14A to 14C are graphs for explaining the effects of dither patterns of the present embodiment on granularity as compared with Japanese Patent Laid-Open Nos. 2000-103088 and 2011-000801. The granularity is measurable physical properties disclosed in Japanese Patent Laid-Open No. 2007-129652 and can be used as a standard for "graininess" which a human visually recognizes. The higher the granularity becomes, the higher the graininess (roughness) becomes.

FIG. 14A is a graph for comparing the result of measurement of granularity on a print medium in a state in which printing position displacement does not occur between the present embodiment and Japanese Patent Laid-Open Nos. 2000-103088 and 2011-000801. In the figure, a horizontal axis shows lightness ($L^*$) which has an inverse relationship with an input signal (0 to 255). In other words, the lower the lightness ($L^*$) becomes, the more dots are printed, and the higher the lightness ($L^*$) becomes, the smaller the number of printed dots becomes. The dither patterns for the first scan and the second scan of the present embodiment are formed to have a correlation in consideration of dispersion. Accordingly, the granularity is kept low in an entire lightness region as compared with Japanese Patent Laid-Open Nos. 2000-103088 and 2011-000801. In particular, the difference is distinct in a region in which the lightness ($L^*$) is high, that is, a region in which the number of dots is small.

FIG. 14B is a graph for comparing a difference from granularity in a state in which printing position displacement occurs between the present embodiment and Japanese Patent Laid-Open Nos. 2000-103088 and 2011-000801. The figure shows a difference between granularity of a print medium in a state in which printing position displacement of 40 μm occurs and the granularity shown in FIG. 14A. The dither patterns for the first scan and the second scan of the present embodiment are formed to have a correlation in consideration of dispersion, and accordingly, small printing position displacement does not cause an increase in granularity. More specifically, in the present embodiment, a state in which granularity is low as shown in FIG. 14A can be maintained in an entire lightness region regardless of whether printing position displacement occurs or not.

FIG. 14C is a graph for comparing a difference $\Delta L^*$ from lightness ($L^*$) in a state in which printing position displacement occurs between the present embodiment and Japanese Patent Laid-Open Nos. 2000-103088 and 2011-000801. The figure shows a difference ($\Delta L^*$) between lightness in a case where printing position displacement does not occur and lightness in a case where printing position displacement of 40 μm occurs. With reference to FIG. 13, again, in Japanese Patent Laid-Open Nos. 2000-103088 and 2011-000801, overlapping dots exist even in a region in which lightness is high, and in a case where printing position displacement occurs, density variation (lightness variation) caused by separation of overlapping dots is likely to occur. However, in a case where a binarization process is performed by using the dither patterns of the present embodiment, an appropriate number of overlapping dots are prepared in an entire gradation range, and accordingly, the number of overlapping dots does not change greatly because of printing position displacement, and ΔL* can be kept at 1.0 or less. As a result, it is possible to keep density (lightness) constant like granularity shown in FIG. 14B.

As explained above, in the present embodiment, the two dither patterns in which the dispersion of print pixels and the positions of overlapping print pixels are appropriately adjusted according to gradation can be prepared for 2-pass multi-pass printing. Since the binarization process is performed by using these dither patterns, it is possible to suppress graininess and density variation caused by printing position displacement in an entire gradation range as compared with Japanese Patent Laid-Open Nos. 2000-103088 and 2011-000801 which disclose performing a plurality of error diffusion methods without correlation. In particular, since it is possible to adapt a histogram explained with reference to FIG. 10 in various manners according to the tendency of printing position displacement, stable density expression can be maintained irrespective of a direction and an amount of printing position displacement. Further, the present embodiment can output a high-quality image at a high speed by performing low-load processing without incurring an increase in the cost of the apparatus or a decrease in processing speed as in Japanese Patent Laid-Open Nos. 2000-103088 and 2011-000801 which disclose performing two error diffusion methods in parallel.

Second Embodiment

In the first embodiment, explanation has been made on the method for forming a dither pattern in which a threshold of 0 to 255 is set to each pixel in a 16×16 pixel area. In the present embodiment, explanation will be made on a method in which a threshold of the same level is set to a plurality of pixels in a dither pattern area.

Also in the present embodiment, the printing apparatus shown in FIGS. 1 to 3 performs 2-pass multi-pass printing as shown in FIG. 4, and dither patterns which can be used for the quantization process 104-1 for the first scan and the quantization process 104-2 for the second scan in image processing shown in FIG. 5 are formed. Regarding a process for forming a dither pattern, a dither pattern can be formed according to the flowcharts of FIGS. 7 and 8. However, in the present embodiment, the size of a dither pattern is 32 pixels×32 pixels, and each threshold of 0 to 255 is set to four pixels in the dither pattern.

In this case, in step S1 of FIG. 7, (2×4×(S+1)) dots are randomly set to 32 pixels×32 pixels. In step S16 of FIG. 8A, each threshold of 0 to S is alternately set to four pixels in the dither pattern for the first scan and four pixels in the dither pattern for the second scan in decreasing order of the Gauss filter value of a pixel (firstly a threshold is set to a pixel whose position "has the highest dot concentration level"). Since the number of dots is (2×4×(S+1)), each threshold of 0 to S is set to four pixels in each dither pattern.

Further, in order to set the threshold in step S23 of FIG. 8B, four pixels are selected such that the counts in the columns of the histogram are on as similar levels as possible, and a threshold T is set to the four pixels.

Figure 15:
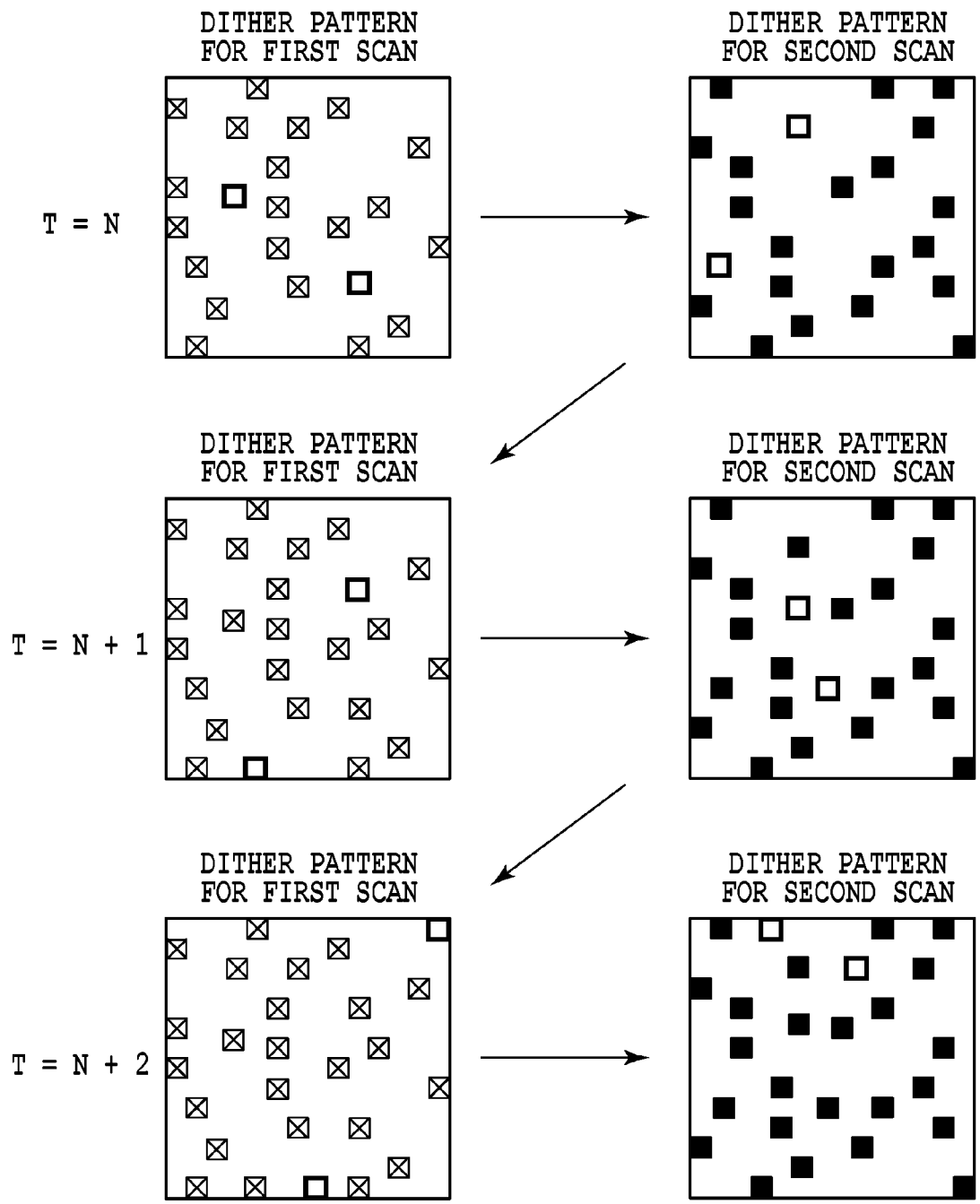
FIG. 15 is a diagram showing a manner in which print pixels are determined for two dither patterns.

FIG. 15 is a diagram showing a manner in which in the present embodiment, print pixels (threshold-set pixels) are alternately determined for dither patterns for the first scan and the second scan according to the flowchart of FIG. 8B. For the sake of simplicity, FIG. 15 shows a state in which two print pixels are set at a time to an area of 16 pixels×16 pixels. In FIG. 15 as in FIG. 11, an outlined square shows a pixel to which a threshold is to be newly set. As the threshold T is changed in order such as N, N+1, N+2, two print pixels are set at a time to the two dither patterns so that upper-, lower-, right-, and left-side adjacent positions exist as uniformly as possible.

Incidentally, explanation has been made on an example in which one threshold is set to four pixels, and then a dither pattern to be processed and a dither pattern for reference are replaced with each other. However, setting of a threshold is not limited to this method. The following method may be adopted: Every time one threshold is set to one pixel, the dither patterns are replaced with each other, and a next threshold is set after the dither patterns are replaced with each other a plurality of times for the same threshold. Further, the following method may be adopted: Every time a threshold changes, the setting order of the dither pattern to be processed and the dither pattern for reference may be changed between the dither pattern for the first scan and the dither pattern for the second scan. Further, the number of pixels to which one threshold is set may not be necessarily the same for all the thresholds. For example, in a case where the number of pixels to which a threshold is set is kept low in a low gradation region, and thresholds are set to many pixels in an intermediate or high gradation region, the quantization process can also serve the role of a gradation correction process. Optical density on a print medium can also be made close to being linear with respect to input data.

Third Embodiment

In the above embodiments, the method for forming two dither patterns corresponding to printing scans has been explained by taking, as an example, the case of performing 2-pass multi-pass printing. In the present embodiment, a method for forming three dither patterns corresponding to three printing scans will be explained by taking, as an example, the case of performing 3-pass multi-pass printing. Incidentally, the printing apparatus shown in FIGS. 1 to 3 is used for the present embodiment.

Figure 16:
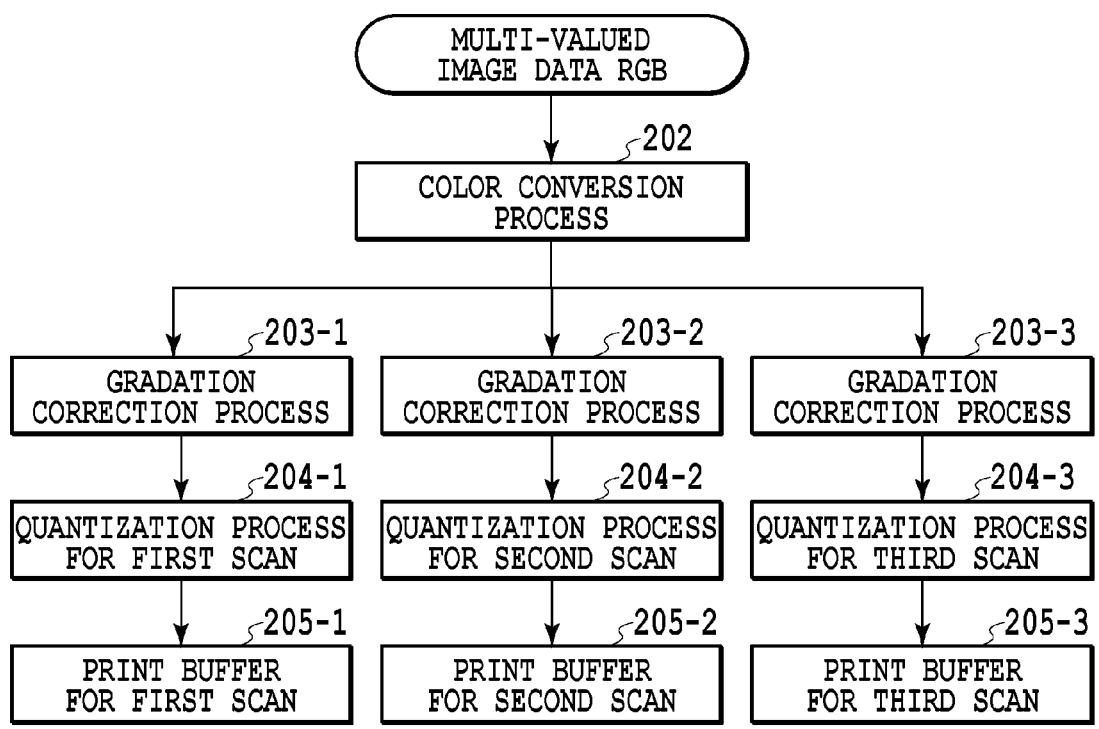
FIG. 16 is a block diagram for explaining a process for converting image data according to a second embodiment.

FIG. 16 is a block diagram for explaining a process for converting image data by the ASIC E1102 of the present embodiment. A color conversion circuit 202 of the present embodiment converts input multi-valued RGB data into first multi-valued data C1, M1, Y1, K1 for a first scan, second multi-valued data C2, M2, Y2, K2 for a second scan, and third multi-valued data C3, M3, Y3, K3 for a third scan. Thereafter, the above multi-valued data is subjected to a gradation correction process 203-1 for the first scan, a gradation correction process 203-2 for the second scan, and a gradation correction process 203-3 for the third scan. The multi-valued data is further subjected to a quantization process 204-1 for the first scan, a quantization process 204-2 for the second scan, and a quantization process 204-3 for the third scan, stored in print buffers, and printed by the corresponding printing scans of the printing head H.

In the present embodiment, different dither patterns are formed for the quantization process 204-1 for the first scan, the quantization process 204-2 for the second scan, and the quantization process 204-3 for the third scan. A method for forming these dither patterns can also be performed according to the flowcharts of FIGS. 7 and 8. Explanation will be made below on a process for forming a dither pattern in a case where a threshold of 0 to 255 is set to each pixel in a 16 pixel×16 pixel area.

In the case of forming three dither patterns, (3×(S+1)) dots are randomly generated in the 16 pixel×16 pixel area in step S11 of FIG. 8A. In step S16, a threshold of 0 to S is alternately set to pixels in the dither pattern for the first scan, pixels in the dither pattern for the second scan, and pixels in the dither pattern for the third scan in decreasing order of the Gauss filter value of a pixel (firstly a threshold is set to a pixel whose position "has the highest dot concentration level"). The number of dots is (3×(S+1)), and each threshold of 0 to S is set to a pixel in each dither pattern.

In initial setting (step S21) of FIG. 8B, the dither pattern for the first scan to which thresholds of 0 to S are already set in step S1 is set to be a dither pattern to be processed, and the dither pattern for the second scan and the dither pattern for the third scan are set to be dither patterns for reference. Further, the threshold T is set so that T=S+1.

In step S22, the histogram evaluation values HV of the dither pattern to be processed with respect to the dither pattern for reference are obtained. A histogram of the present embodiment is almost similar to that of the above embodiments, but the histogram of the dither pattern to be processed is counted based on the two dither patterns for reference. For example, in a case where any print pixel in the dither pattern to be processed is regarded as a target pixel, and a print pixel in the dither pattern for the second scan is on the upper side of and adjacent to the target pixel, and a print pixel in the dither pattern for the third scan is on the right side of and adjacent to the target pixel, one is added to numbers in columns of "UPPER SIDE" and "RIGHT SIDE." Further, in a case where a print pixel in the dither pattern for the second scan and a print pixel in the dither pattern for the third scan are on the upper side of and adjacent to the target pixel, two is added to the number in the column of "UPPER SIDE." However, the histogram of the dither pattern to be processed does not necessarily have to be counted by this method. For example, the histogram evaluation values of the dither pattern to be processed can be the averages of the counts for the other two dither patterns or can be obtained by multiplying the counts for each dither pattern by a weight coefficient and summing the multiplied counts. Needless to say, an area in which print pixels are counted is not limited as in the above embodiments, and a histogram for an appropriate area can be prepared depending on circumstances as shown in Tables 2 and 3.

In the present embodiment, this histogram is prepared for each of the dither pattern for the first scan, the dither pattern for the second scan, and the dither pattern for the third scan. Every time a threshold-set pixel (print pixel) is newly set in step S23 in any of the dither patterns, each histogram is updated.

Processing after step S23 is substantially the same as that of the above embodiments. However, in the present embodiment, the three dither patterns are successively set to be the dither patterns to be processed, and accordingly, replacement of the dither pattern to be processed and the dither pattern for reference in step S26 is performed in three patterns in a cyclic manner. More specifically, steps S22 to S27 are repeated, thereby successively performing a first obtaining step and a first determining step for the first dither pattern, a second obtaining step and a second determining step for the second dither pattern, and a third obtaining step and a third determining step for the third dither pattern. As a result, print pixels in these dither patters are successively set.

Figure 17A:
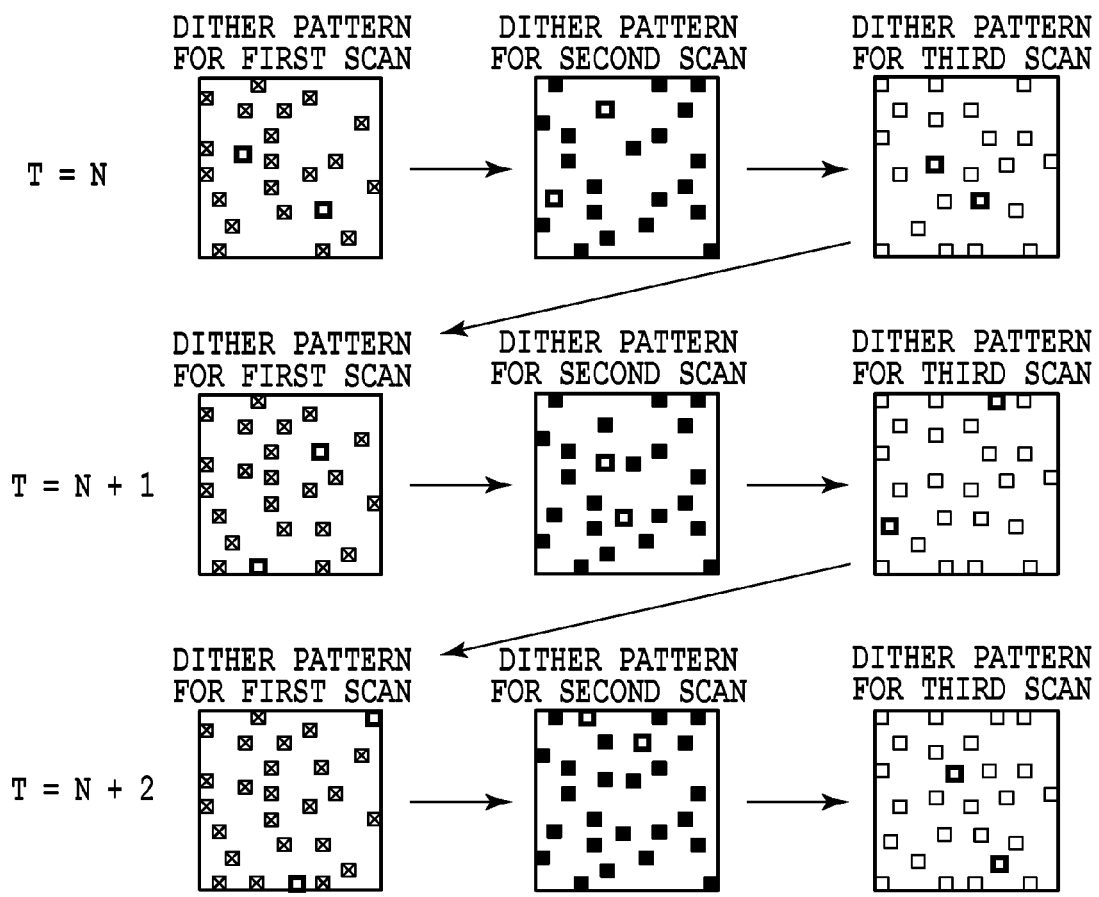
FIGS. 17A and 17B are diagrams showing a manner in which print pixels are determined for three dither patterns.
Figure 17B:
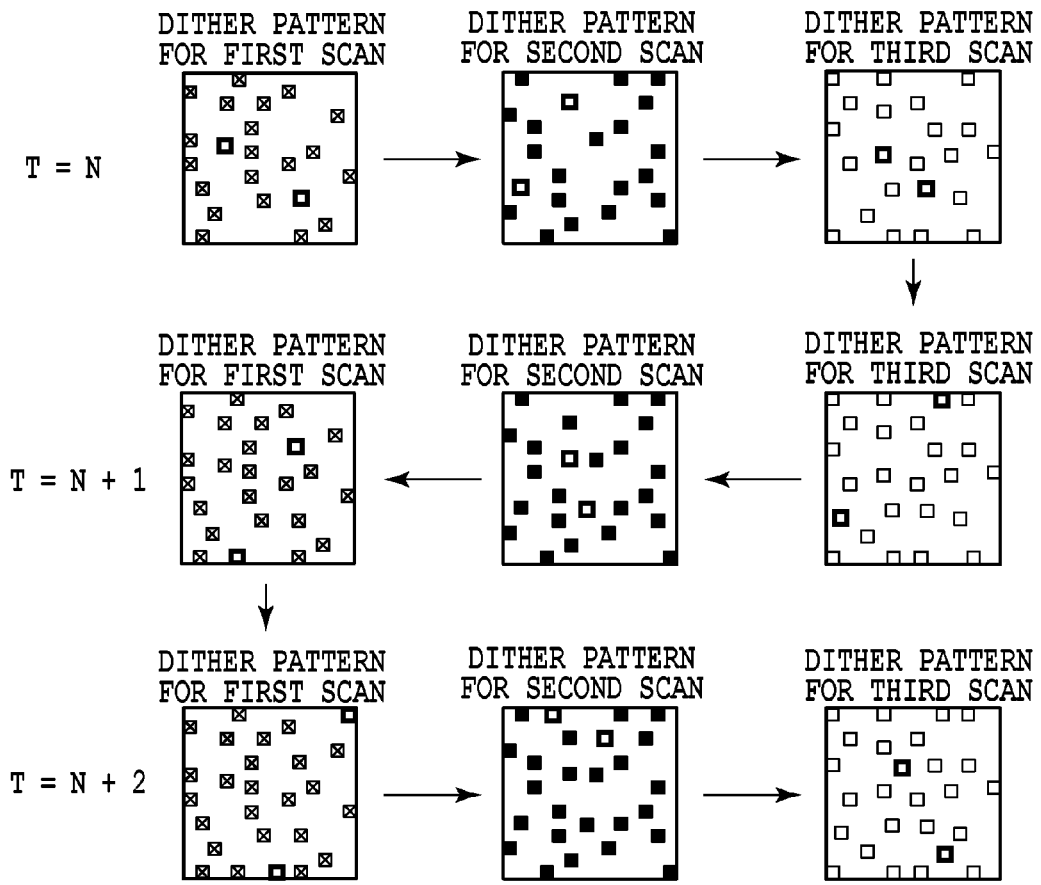

FIGS. 17A and 17B are diagrams showing a manner in which print pixels (threshold-set pixels) are successively determined for the three dither patterns. In the figure, an outlined square shows a pixel to which a threshold is to be newly set. In the three dither patterns, as the threshold T is changed in order such as N, N+1, N+2, print pixels are set one-by-one so that upper-, lower-, right-, and left-side adjacent positions are distributed as uniformly as possible. FIG. 17A shows a case where anyone threshold is set to the dither patterns in the order of the dither pattern for the first scan→the dither pattern for the second scan→the dither pattern for the third scan. Further, FIG. 17B shows a case where one threshold is set to the dither patterns in order of the dither pattern for the first scan→the dither pattern for the second scan→the dither pattern for the third scan, and then next threshold is set to the dither patterns in order of the dither pattern for the third scan→the dither pattern for the second scan→the dither pattern for the first scan. As shown above, the order of setting a threshold is not particularly limited. For example, every time a threshold is changed, setting order of the dither pattern to be processed and the dither patterns for reference can be changed among the three dither patterns.

In the above-explained embodiment, three dither patterns in which the dispersion of print pixels and the positions of overlapping pixels are appropriately adjusted according to gradation can be prepared to perform 3-pass multi-pass printing. Since a binarization process is performed by using these dither patterns, it is possible to suppress graininess and density variation caused by printing position displacement in an entire gradation range.

Incidentally, the first and second embodiments have been explained by taking, as an example, the case of preparing the two dither patterns for 2-pass multi-pass printing and the third embodiment has been explained by taking, as an example, the case of preparing three dither patterns for 3-pass multi-pass printing. However, the present invention is not limited to these cases. Needless to say, in order to perform multi-pass printing of 4 or more passes, four or more dither patterns can be formed by further developing the method of the third embodiment.

Fourth Embodiment

In the present embodiment, explanation will be made on a method for setting a threshold for a dither pattern in consideration of not only histogram evaluation values HV, but also dispersion evaluation values DV.

Also in the present embodiment, dither patters which can be used for the binarization process 104-1 for the first scan and the binarization process 104-2 for the second scan in the image processing shown in FIG. 5 are formed so that the printing apparatus shown in FIGS. 1 to 3 performs 2-pass multi-pass printing as shown in FIG. 4. Regarding a process for forming a dither pattern, the present embodiment uses the processes shown in FIGS. 7 and 8A like the first embodiment.

Figure 18:
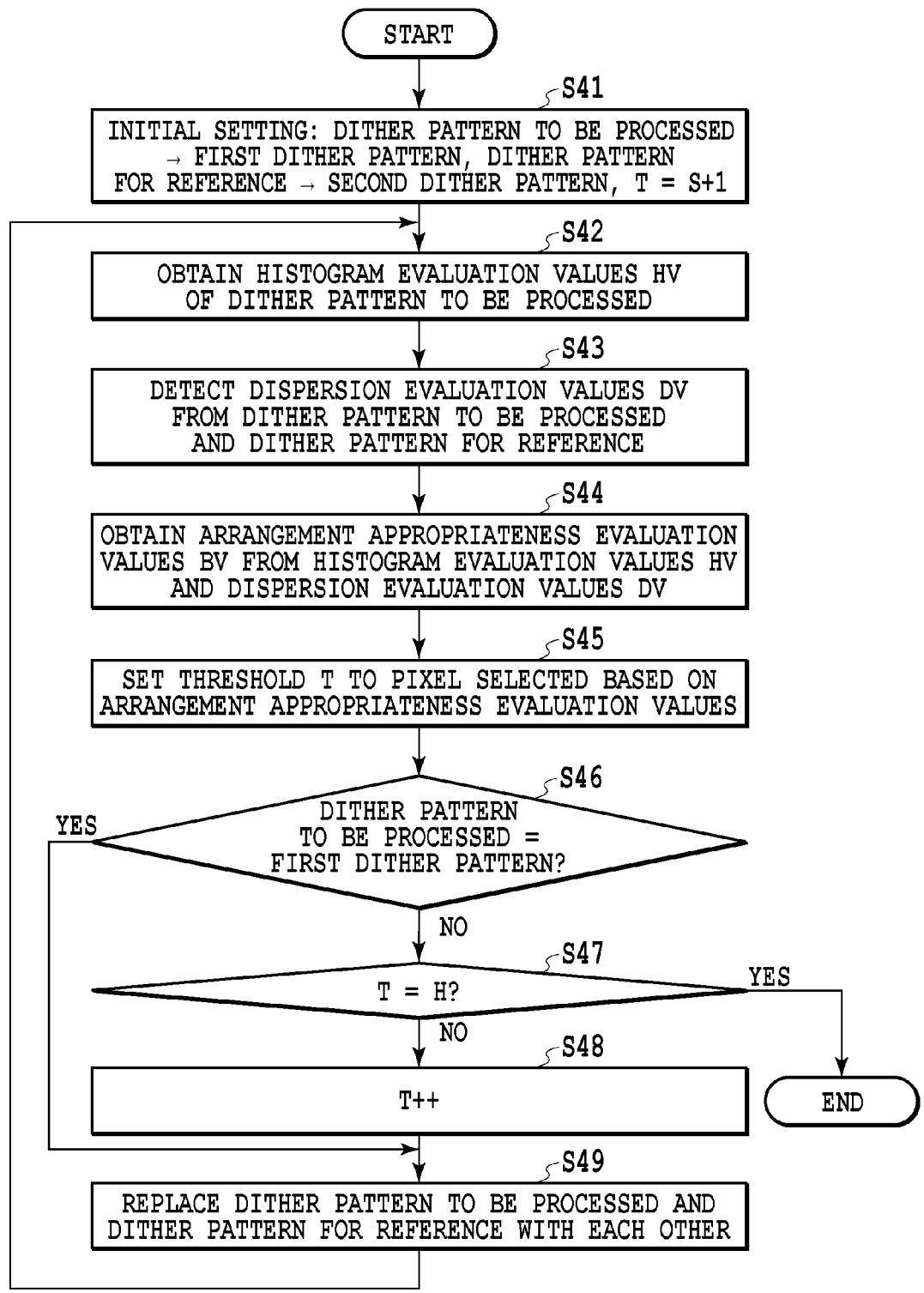
FIG. 18 is a flowchart showing a process for setting an intermediate-level threshold according to a third embodiment.

FIG. 18 is a flowchart for explaining a process for setting an intermediate-level threshold (S+1 to H) to a dither pattern in step S2 of FIG. 7 according to the present embodiment.

When this process is started, firstly, predetermined initial setting is performed in step S41. More specifically, the dither pattern for the first scan to which thresholds of 0 to S are already set in step S1 is set to be a dither pattern to be processed, and the dither pattern for the second scan is set to be a dither pattern for reference. Further, the threshold T is set so that T=S+1.

In step S42, the histogram evaluation values HV of the dither pattern to be processed with respect to the dither pattern for reference are obtained. The form of a histogram is the same as that of the above embodiments explained with reference to FIG. 10.

Figure 19:
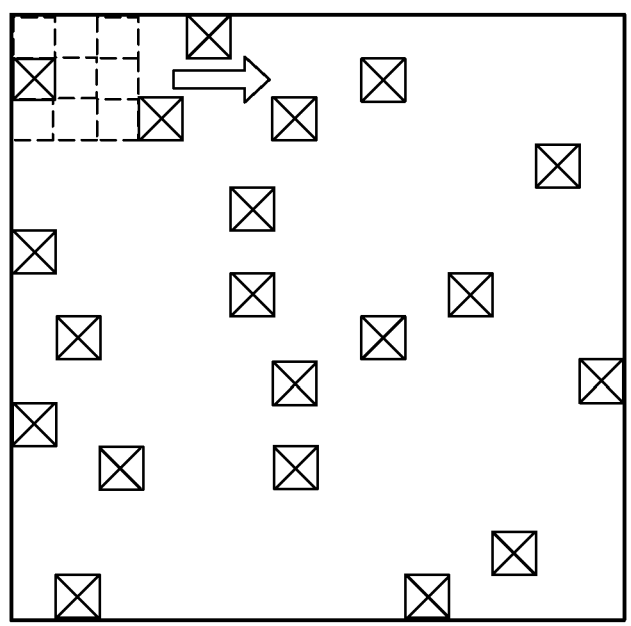
FIG. 19 is a diagram for explaining a method for obtaining dispersion evaluation values DV.

In step S43, dispersion evaluation values DV are obtained for a pattern obtained by combining the dither pattern to be processed and the dither pattern for reference. The dispersion evaluation values DV can be obtained by shifting a 3×3 Gauss filter one pixel at a time in a pattern area as shown in FIG. 19, for example, and performing dispersion detection for each pixel. Incidentally, another parameter such as RMS granularity can be used for the dispersion evaluation values DV if it serves as a standard for dot concentration level.

In step S44, arrangement appropriateness evaluation values BV are obtained from the histogram evaluation values HV obtained in step S42 and the dispersion evaluation values DV obtained in step S43. A method for calculating an arrangement appropriateness evaluation value BV is not limited, but an arrangement appropriateness evaluation value BV can be obtained by multiplying a histogram evaluation value HV and a dispersion evaluation value DV by predetermined coefficients α and β, respectively, and summing the multiplied histogram evaluation value and the multiplied dispersion evaluation value according to the following formula, for example:

$$BV = \alpha \times HV + \beta \times DV$$

Further, in step S45, an appropriate pixel is selected from pixels to which a threshold is not set yet in the dither pattern to be processed (the dither pattern which is being formed) based on the arrangement appropriateness evaluation values BV, and the threshold T is set to the pixel. As a result, the threshold T is set to pixels such that the distribution of a histogram to be processed becomes as uniform as possible and that the dispersion of the threshold-set pixel in the dither pattern to be processed becomes as uniform as possible. Subsequent steps S46 to S49 are the same as steps S24 to S27 of FIG. 8B.

In the above-explained present embodiment, it is possible to prepare a dither pattern in which the dispersion of print pixels in intermediate gradation is further emphasized than in the above embodiments. Since a binarization process is performed by using these dither patterns, it is possible to suppress graininess and density variation caused by printing position displacement in an entire gradation range.

Fifth Embodiment

The dither patterns explained in the first to fourth embodiments can also be adopted for a full-line type inkjet printing apparatus which does not perform multi-pass printing. Explanation will be made below on an embodiment in which the full-line type inkjet printing apparatus is adopted.

Figure 20:
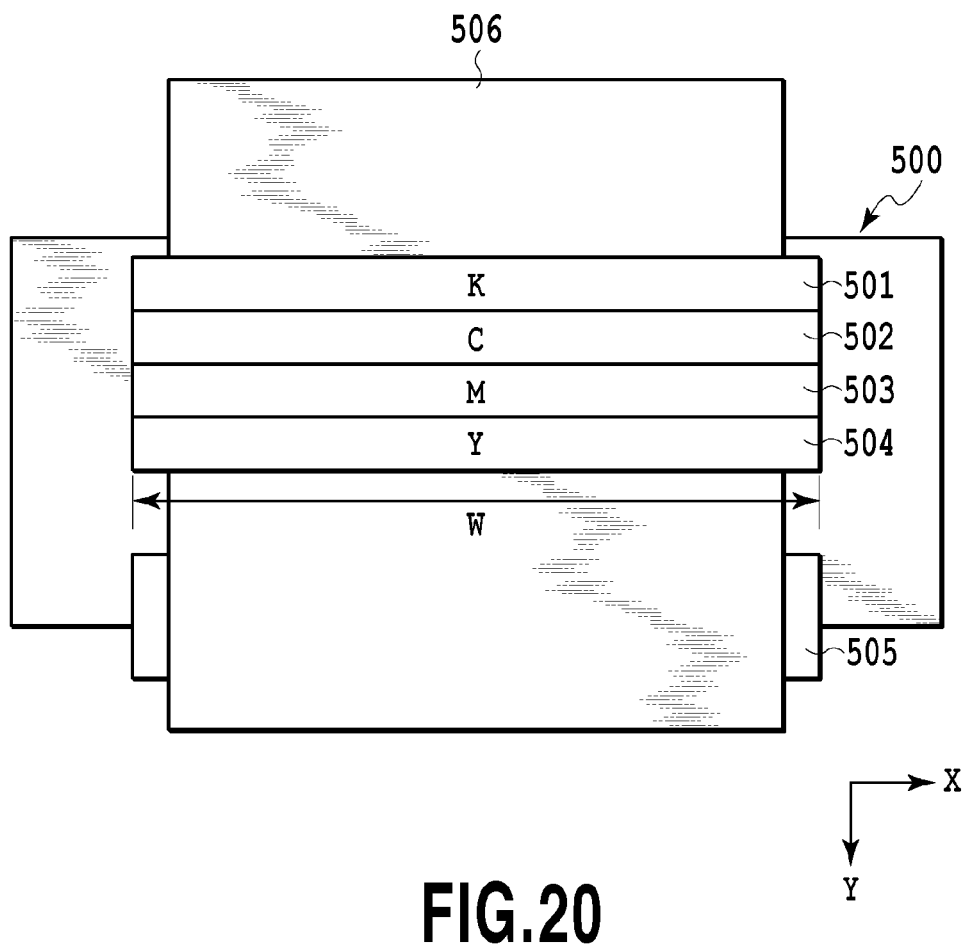
FIG. 20 is a top view of a printing unit of a full-line type inkjet printing apparatus.

FIG. 20 is a top view of a printing unit of a full-line type inkjet printing apparatus (image forming apparatus). In an inkjet printing apparatus 500, printing heads 501 to 504 are fixedly arranged on a frame as shown in the figure. The printing heads 501 to 504 eject black (K), cyan (C), magenta (M), and yellow (Y) inks, respectively. In each printing head, printing elements for ejecting a color ink are arranged in the X direction of the figure with certain pitches.

A print medium 506 is conveyed at a certain speed in the Y direction by rotation of a conveyance roller 505 driven by a motor (which is not shown in the figure). During this conveyance, ink is ejected by the printing elements according to print data, thereby printing a predetermined image on the print medium 506.

Figure 21:
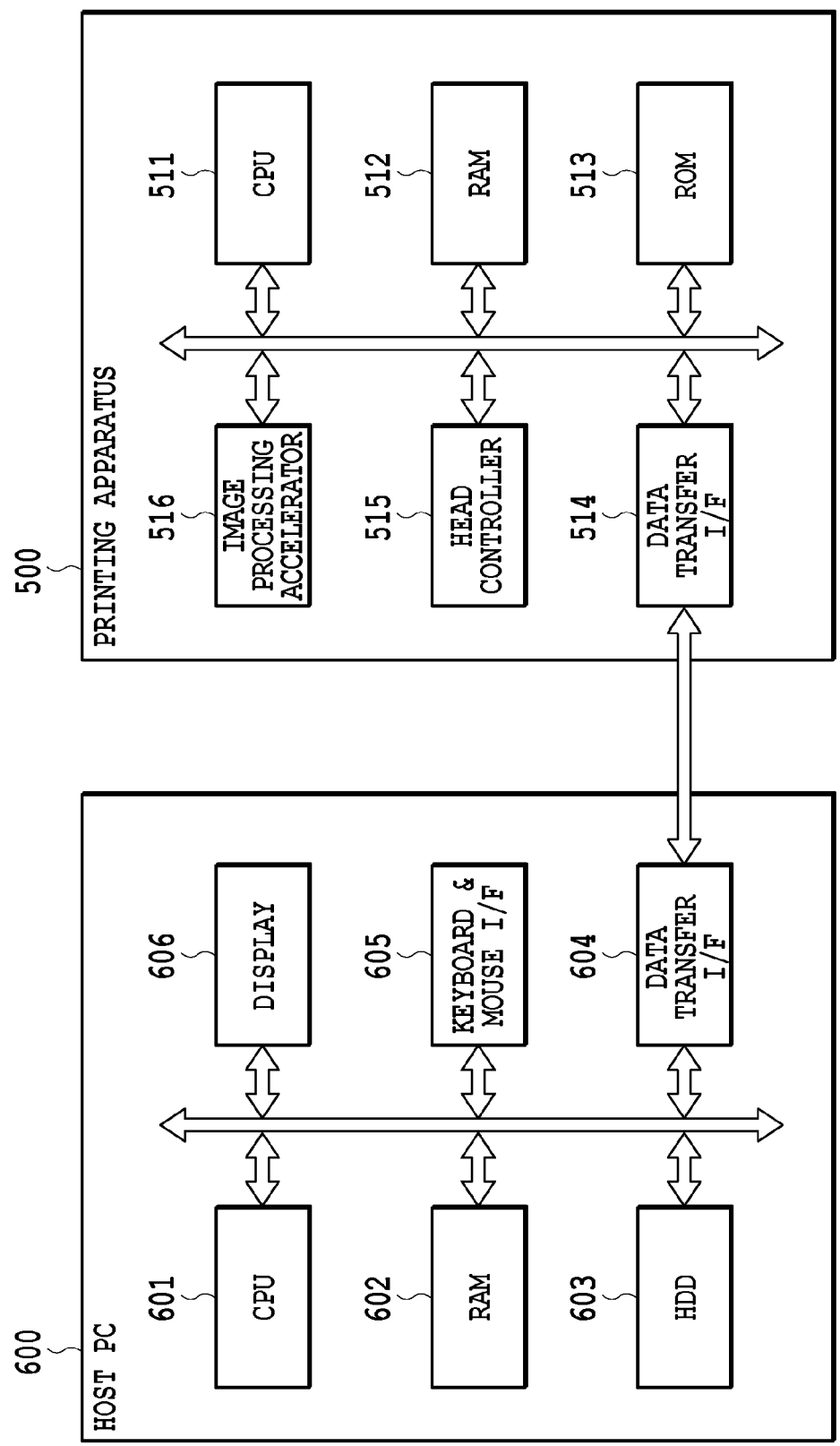
FIG. 21 is a block diagram showing a printing system according to a fourth embodiment.

FIG. 21 is a block diagram showing a printing system according to the present embodiment. As shown in the figure, this printing system includes a printing apparatus 500 and a host device (PC) 600. The host device 600 transmits image data to the printing apparatus 500.

The host PC 600 mainly has the following elements. A CPU 601 performs various types of processing according to a program held in a hard disk (HDD) 603 or a RAM 602 which is a storage unit. The HDD 603 is a nonvolatile storage, and holds a program to be executed by the CPU 601 and various types of data. The RAM 602 is a volatile storage and temporarily holds a program or data and is used as a work area of the CPU 601. A data transfer interface (I/F) 604 controls data transmission and reception to and from a data transfer interface (I/F) 514 of the printing apparatus 500. It is possible to use, as a connection scheme for data transmission and reception, USB, IEEE 1394, LAN, or the like. A keyboard & mouse I/F 605 is an I/F for controlling a human interface device (HID) such as a keyboard or a mouse. A user can input various commands and parameters via this I/F. A display I/F 606 controls displaying by a display device (which is not shown in the figure).

The printing apparatus 500 mainly has the following elements. A CPU 511 performs processing of embodiments which will be described later according to a program held in a ROM 513 or a RAM 512. The RAM 512 is a volatile storage and temporarily holds program data to be executed by the CPU 511 and is used as a work area. The ROM 513 is a nonvolatile storage and can hold a program and table data which is generated by processing of embodiments which will be described later. A data transfer I/F 514 controls data transmission and reception to and from a data transfer interface (I/F) 604 of a host PC 200.

A head controller 515 supplies print data to the printing heads 501 to 504 and controls ejection of the printing heads. More specifically, the CPU 511 writes, to a predetermined address of the RAM 512, a control parameter and print data which are necessary for driving of the printing elements, thereby activating the head controller 515 and causing the printing heads to eject ink.

An image processing accelerator 516 is hardware and performs image processing faster than the CPU 511. The image processing accelerator 516 can be configured to read, from a predetermined address of the RAM 512, a parameter and data which are necessary for image processing. The CPU 511 writes, to a predetermined address of the RAM 512, a parameter and image data which are necessary for image processing, thereby activating the image processing accelerator 516 to perform predetermined image processing. Incidentally, the image processing accelerator 516 is not an essential element, and depending on the specifications of the printing apparatus, and the like, it is possible to perform, only by the CPU 511, the above processing for generating a table parameter and processing an image.

Explanation will be made below on printing position displacement which occurs in the full-line type printing apparatus of the present embodiment.

Figures 22A, 22B:
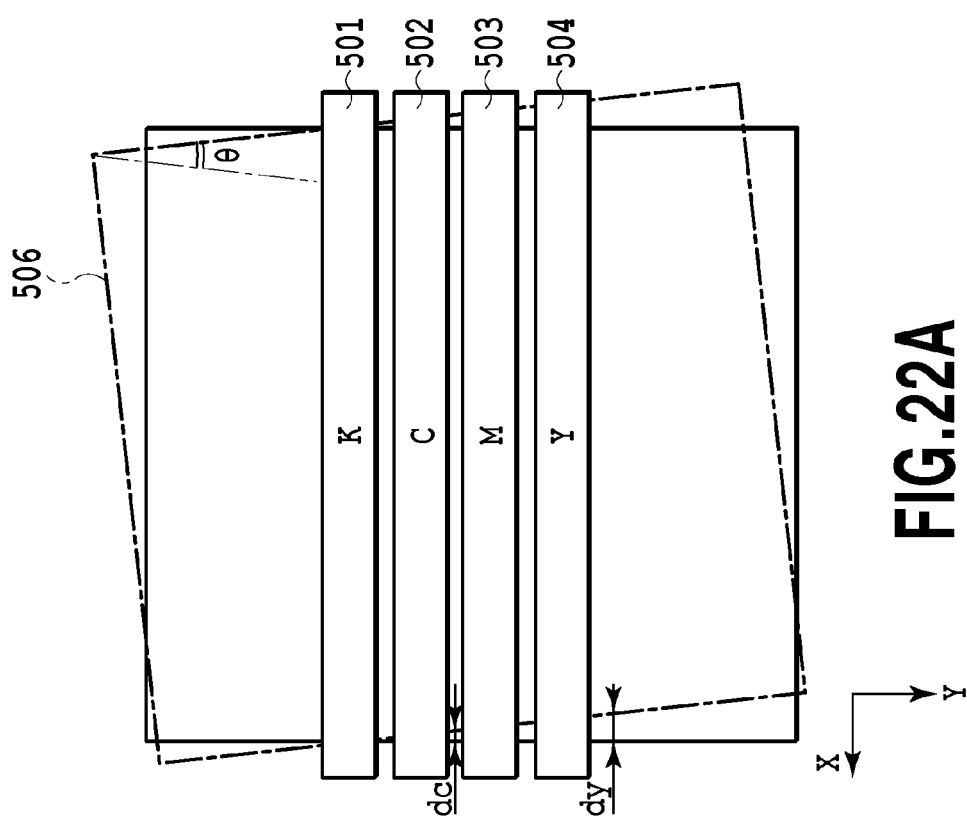
FIGS. 22A and 22B are diagrams showing printing position displacement in a full-line type printing apparatus.

FIGS. 22A and 22B are schematic diagrams for explaining printing position displacement in the full-line type printing apparatus. With reference to FIG. 22A, there is a case where in the printing apparatus, the print medium 506 is conveyed in an inclined state as shown by a dashed line of the figure. This inclined state during the conveyance occurs in a case where right- and left-side holders for holding the print medium are misaligned, or in a case where the coefficient of friction of the conveyance roller 505 is not constant. However, it is difficult to reduce its manufacture tolerance to zero. In a case where the inclined state occurs, the printing position of each printing head is misaligned in the X direction. For example, in a case where the print medium 506 is inclined at an angle θ relative to the Y direction which is a normal conveyance direction, the printing position of the cyan printing head 502 is misaligned a distance dc in the X direction from the printing position of the black printing head 501. Further, the printing position of the yellow printing head 504 is misaligned a distance dy which is larger than the distance dc in the X direction from the printing position of the black printing head 501.

Further, with reference to FIG. 22B, in a case where the conveyance roller 505 for conveying the print medium 506 in the Y direction includes a plurality of conveyance roller pairs 505a to 505c, their cross sections occasionally become elliptical because of a manufacturing error and fatigue caused by use. In this case, the amount of Y-direction conveyance achieved by one rotation becomes unstable, and the printing positions of the printing heads are not the same in the Y direction.

As stated above, in the full-line type printing apparatus having the plurality of printing heads, the relative printing positions of the printing heads are occasionally misaligned in the X direction or the Y direction because of various manufacturing errors, sudden conveyance change, or conveyance change caused by fatigue. As a result, as compared with an image printed on the print medium 506 which is normally conveyed, the state of overlapping dots may change, thereby causing density variation and hue variation.

In this regard, there are concerns that as a distance between the two printing heads becomes larger, the amount of relative misalignment between their printing positions becomes larger, and its adverse effects become larger. More specifically, in a case where the black, cyan, magenta, and yellow printing heads are arranged side-by-side in order named from an upstream side in the Y direction as shown in FIG. 22A, it is presumed that printing position displacement between the black printing head 501 and the yellow printing head 504 becomes the largest. However, as explained above, the distinctness of density variation and hue variation caused by printing position displacement varies depending on a combination of ink colors as well.

Accordingly, in the present embodiment, dither patterns for keeping constant the coverage of dots on a print medium despite printing position displacement are prepared for a combination of two printing heads which makes particularly noticeable density variation and hue variation caused by printing position displacement. On the other hand, dither patters which prioritize achieving high dot dispersion to suppress visual graininess over keeping constant the coverage of dots on a print medium are prepared for a combination of printing heads which makes unnoticeable density variation and hue variation. Explanation will be made below assuming that in the present embodiment, the combination of printing heads which makes noticeable density variation and hue variation caused by printing position displacement is the printing head 502 for ejecting cyan ink and the printing head 503 for ejecting magenta ink.

Figure 23:
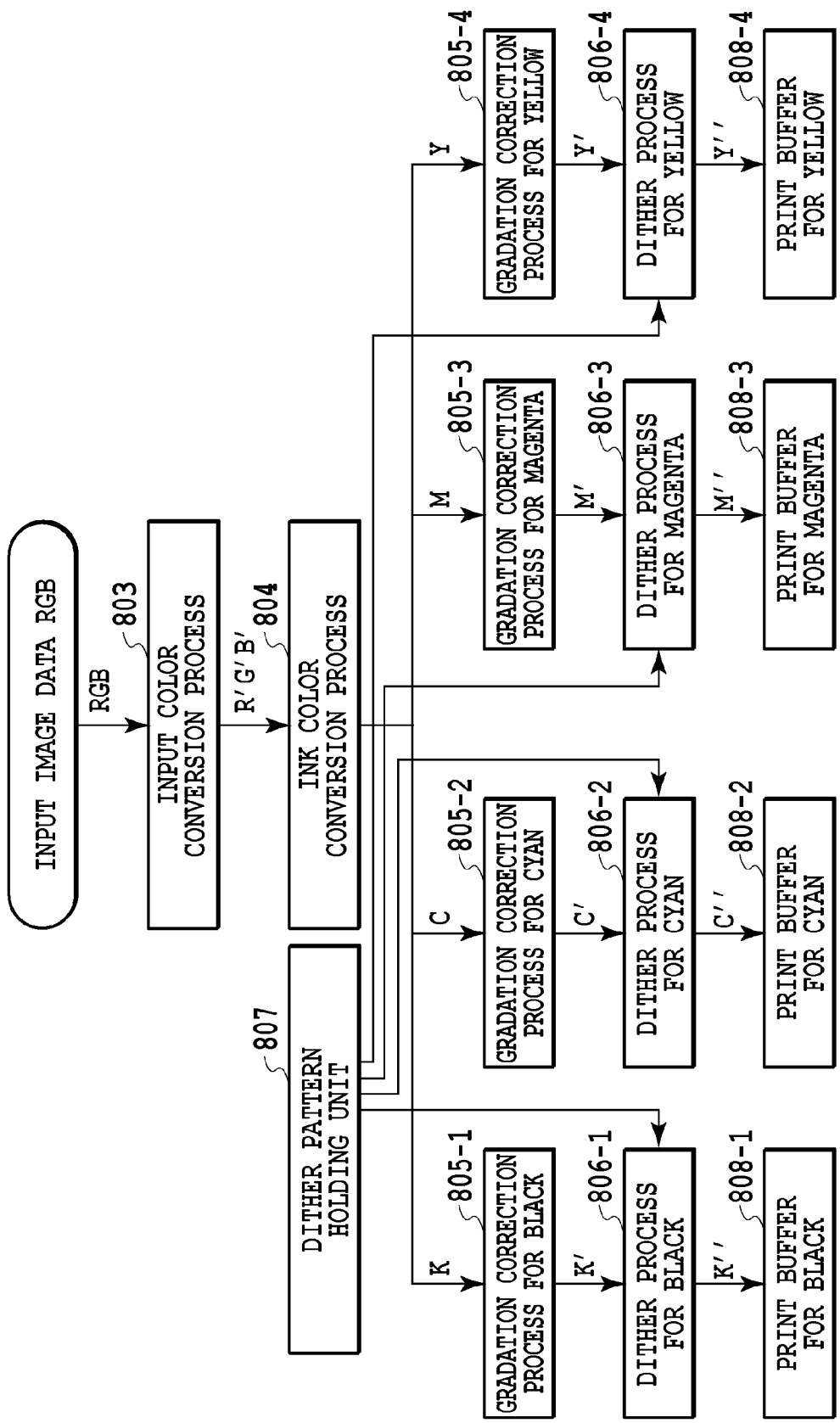
FIG. 23 is a block diagram for explaining specific image processing according to the fourth embodiment.

FIG. 23 is a block diagram for explaining specific image processing by the image processing accelerator 516 according to the present embodiment. Image data received from the host PC 600 is multi-valued data showing color coordinates (R, G, B) in color space coordinates such as sRGB which are expressible colors of a monitor. The image processing accelerator 516 firstly transmits this multi-valued data to an input color conversion process unit 803, which converts the multi-valued data into multi-valued data R', G', B' corresponding to color reproduction regions of the printing apparatus. More specifically, the multi-valued data RGB is converted into multi-valued data R', G', B' by using a three-dimensional lookup table (LUT) and interpolation operation. Incidentally, as another conversion method, a method such as matrix operation processing can also be used.

A subsequent ink color conversion process unit 804 converts the multi-valued data processed by the input color conversion process unit 803 into multi-valued color signal data corresponding to ink colors used by the printing apparatus. The printing apparatus 500 of the present embodiment uses black (K), cyan (C), magenta (M), and yellow (Y) inks, and accordingly, the multi-valued data R', G', B' is converted into multi-valued data K, C, M, Y. Like the above-described input color conversion process unit, this color conversion process unit 804 uses both the three-dimensional lookup table and the interpolation operation. Incidentally, as another conversion method, a method such as matrix operation processing can also be used.

The following processing is performed for each ink color. Gradation correction process units 805-1 to 805-4 correct the multi-valued color signal data CMYK which is subjected to an ink color conversion process to adjust the number of dots which are to be actually printed. In general, the number of dots printed on a print medium is not linear with respect to optical density on the print medium which is realized with the dots printed on the print medium. Accordingly, in order to make the above relationship linear, the gradation correction process units 805-1 to 805-4 perform linear transformation of multi-valued color signal data CMYK, thereby adjusting the number of dots printed on the print medium. More specifically, CMYK is converted into C'M'Y'K' by referring to a one-dimension lookup table prepared for each ink color.

Dither process units 806-1 to 806-4 quantize multi-valued color signal data C'M'Y'K' processed by the gradation correction process unit 805, and generates one-bit binary data C"M"Y"K" indicating printing "1" or no-printing "0". On this occasion, a dither method is adopted as a quantization method. In the dither method, a quantization process is performed by referring to dither patterns in which a threshold is set to each pixel beforehand. Regarding dither patterns of the present embodiment, a dither pattern storing unit 807 stores a different dither pattern for each ink color, that is, for each printing head. The details of the dither patterns will be explained later.

The quantized print data output from the dither process units 806-1 to 806-4 is stored in print buffers 808-1 to 808-4 for the printing heads in the RAM 512 and then printed by the corresponding printing heads.

In the present embodiment, the two dither patterns explained in the first embodiment are used as a dither pattern for cyan and a dither pattern for magenta. More specifically, these two types of dither patterns are stored in the dither pattern storing unit 807 and used for the dither process 806-2 for cyan and the dither process 806-3 for magenta. As a result, it is possible to achieve, for a group of cyan dots and a group of magenta dots, advantageous results similar to the advantageous results explained in the first embodiment, that is, the advantageous results achieved for the group of dots printed by the first printing scan and the second printing scan. Needless to say, the two dither patterns having large areas as explained in the second embodiment can also be used as the dither pattern for cyan and the dither pattern for magenta. Further, the dither patterns formed in consideration of both the histogram evaluation values HV and the dispersion evaluation values DV as explained in the fourth embodiment can also be used as the dither pattern for cyan and the dither pattern for magenta. In any case, the advantageous results of the dither patterns can be obtained among the printing head for cyan and the printing head for magenta, and graininess and hue variation caused by printing position displacement can be appropriately suppressed in an entire gradation range.

Sixth Embodiment

Also in the present embodiment, the full-line type printing apparatus explained in the fifth embodiment and shown in FIGS. 20 to 22 is used and image processing is performed according to the block diagram of FIG. 23. However, the present embodiment eliminates adverse effects on an image caused by printing position displacement of the three printing heads 501 to 503 for cyan, magenta, and yellow, not the two printing heads for cyan and magenta. In order to do that, the present embodiment uses the three dither patterns formed according to the process explained in the third embodiment as the dither pattern for cyan, the dither pattern for magenta, and the dither pattern for yellow. More specifically, these three types of dither patterns are stored in the dither pattern storing unit 807, and used for the dither process 806-2 for cyan, the dither process 806-3 for magenta, and the dither process 806-4 for yellow.

As a result, it is possible to appropriately adjust the dispersion of print pixels and the positions of overlapping print pixels according to gradation for cyan dots, magenta dots, and yellow dots, and suppress graininess and hue variation caused by printing position displacement in an entire gradation range.

Incidentally, the fifth embodiment has been explained by taking, as an example, the case of using the two dither patterns for cyan and magenta, and the sixth embodiment has been explained by taking, as an example, the case of using the three dither patterns for cyan, magenta, and yellow. However, in the present invention, dither patterns can also be prepared in consideration of printing position displacement of many more printing heads. In this regard, in a case where four or more dither patterns are formed by further developing the method of the third embodiment and used for the different printing heads, it is possible to appropriately adjust the dispersion of print pixels and the positions of overlapping print pixels according to gradation for all the printing heads.

Further, in the fifth and sixth embodiments, explanation has been made on a case where different dither patterns are prepared for a plurality of printing heads ejecting different color inks. However, the dither patterns can be prepared for a plurality of printing heads ejecting the same type of ink. In this case, the ejection amounts of the plurality of printing heads ejecting the same color ink may be the same or different.

Seventh Embodiment

In the present embodiment, explanation will be made on a method for reducing printing position displacement occurred in a connecting portion in a line head. The present embodiment uses the full-line type printing apparatus explained in the fifth embodiment and shown in FIGS. 20 to 22.

Figure 24:
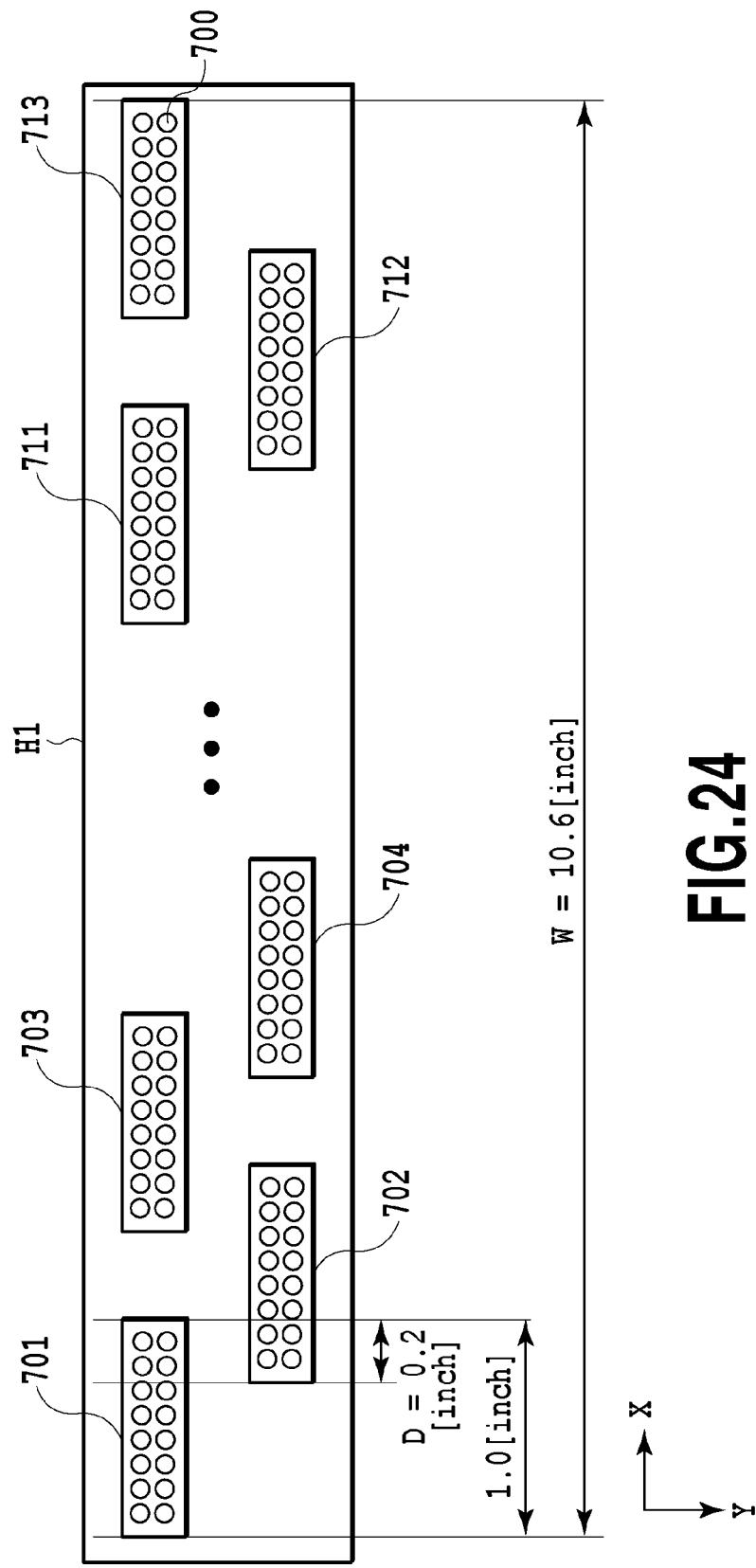
FIG. 24 is a schematic diagram for explaining the arrangement of ejection ports on a printing head.

FIG. 24 is a schematic diagram for explaining the arrangement of ejection ports on the one printing head 501. In each of the printing heads 501 to 504 of the present embodiment, 13 printing element substrates 701 to 713 on which a plurality of printing elements are formed are arranged. In each printing element substrate, ejection ports 700 arranged in the resolution of 600 dpi (dot/inch) in the X direction are arranged in two rows which are displaced from each other in the Y direction. The 13 printing element substrates 701 to 713 are alternately displaced in the Y direction as shown in the figure, and the ejection ports 700 are positioned with pitches of 600 dpi in the X direction. In this regard, connecting portions D with a width of 0.2 inch are provided in two adjacent printing element substrates, such as printing element substrates 701 and 702. The 13 printing element substrates as a whole can print an image having a width of 10.6 inches corresponding to the print width W of a print medium P. The print head in which the plurality of printing element substrates are connected as stated above can realize higher yields at the time of manufacturing than a printing head having one large printing element substrate on which many printing elements are formed. However, in the case of arranging the plurality of printing element substrates, an arrangement error inevitably occurs at the time of manufacturing. This arrangement error occasionally causes printing position displacement between the printing element substrates in the connecting portions and causes density variation.

Figure 25B:
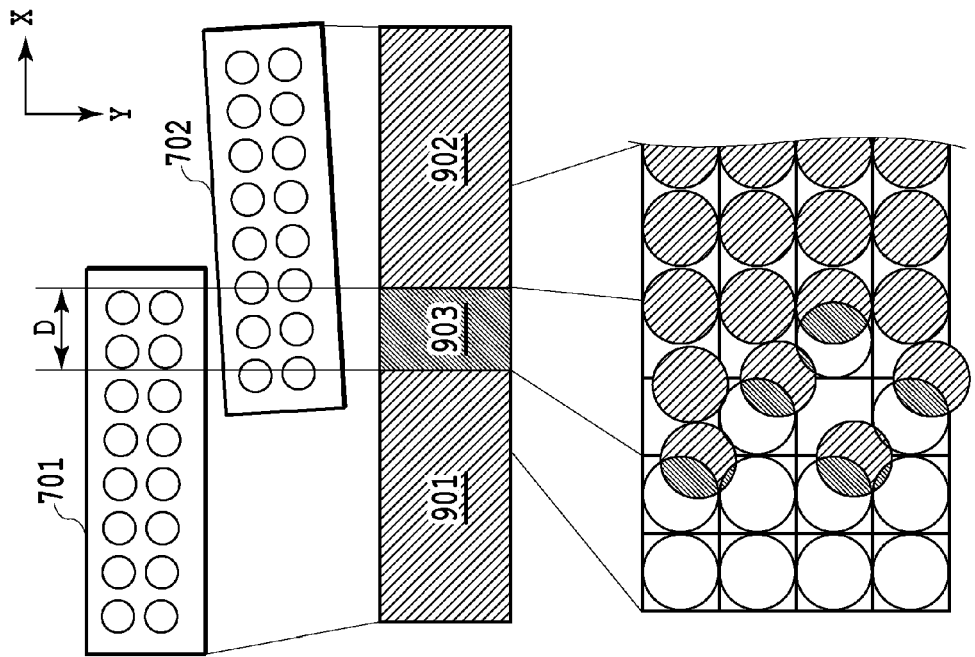
FIGS. 25A and 25B are diagrams for explaining a mechanism in which density unevenness is caused.
Figure 25A:
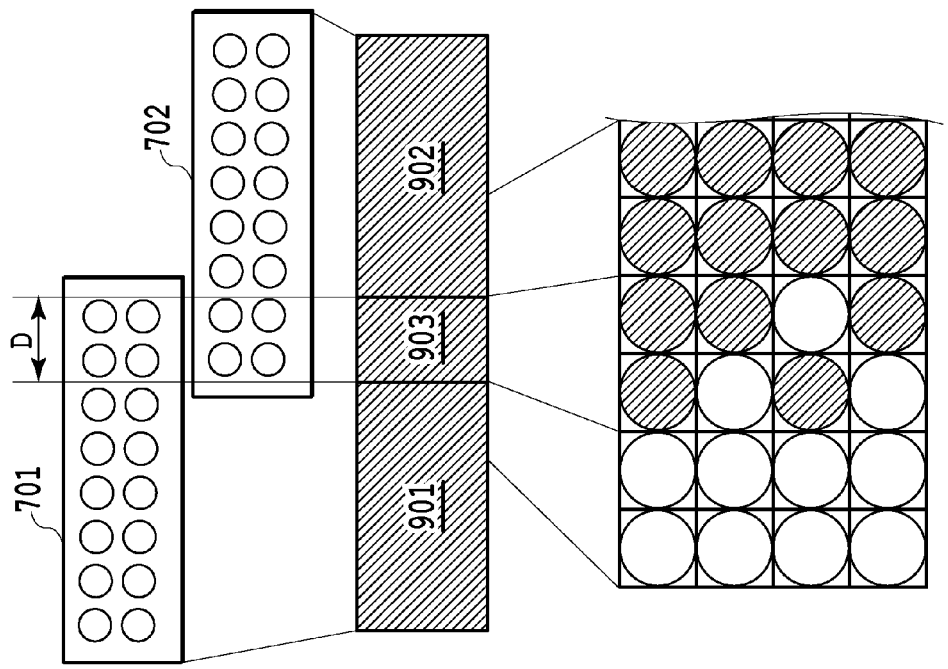

FIGS. 25A and 25B are schematic diagrams for explaining a mechanism in which the above arrangement error causes density unevenness. FIG. 25A shows a state in which an arrangement error does not occur between the printing element substrates 701 and 702, and FIG. 25B shows a state in which the printing element substrate 702 is provided in an inclined state relative to the printing element substrate 701.

In a case where such connecting head is used to perform printing, in an area which is to be printed by a non-connecting portion of the printing element substrate, dots are printed by relative movement of one printing element substrate relative to a print medium. In the figure, reference numeral 901 denotes an image area which is printed by a non-connecting portion of the printing element substrate 701, and reference numeral 902 denotes an area which is printed by a non-connecting portion of the printing element substrate 702. Further, in an area which is to be printed by the connecting portions D of the printing element substrates, dots are printed by the two printing element substrates in a complementary manner. More specifically, the arrangement of dots printed by the connecting portions D depends on a state of overlapping of a group of dots printed by the relative movement of the print medium and the first printing element substrate 701 and a group of dots printed by relative movement of the print medium and the second printing element substrate 702. In the figure, reference numeral 903 denotes an area which is printed by the connecting portions D of the first printing element substrate 701 and the second printing element substrate 702.

In a case where an arrangement error does not occur, the groups of dots printed by the printing element substrate 701 and the printing element substrate 702 are arranged as shown in FIG. 25A, and there is no difference in dot arrangement between connecting portions and non-connecting portions. However, in a case where an arrangement error occurs, the groups of dots printed by the printing element substrate 701 and the printing element substrate 702 are misaligned from each other, and dots printed by the connecting portions D overlap or are separated from each other in a random manner (FIG. 25B). More specifically, the coverage of dots printed by the connecting portions is lower than the coverage of dots printed by the non-connecting portions, and sufficient density cannot be obtained. As a result, an output image includes, in an alternate arrangement, a normal-density area which is printed by a non-connecting portion and a low-density area which is printed by connecting portions, and density unevenness is recognized.

In the present invention, the dither patterns explained in the above embodiments can be effectively used for printing position displacement between the printing element substrates.

Figure 26:
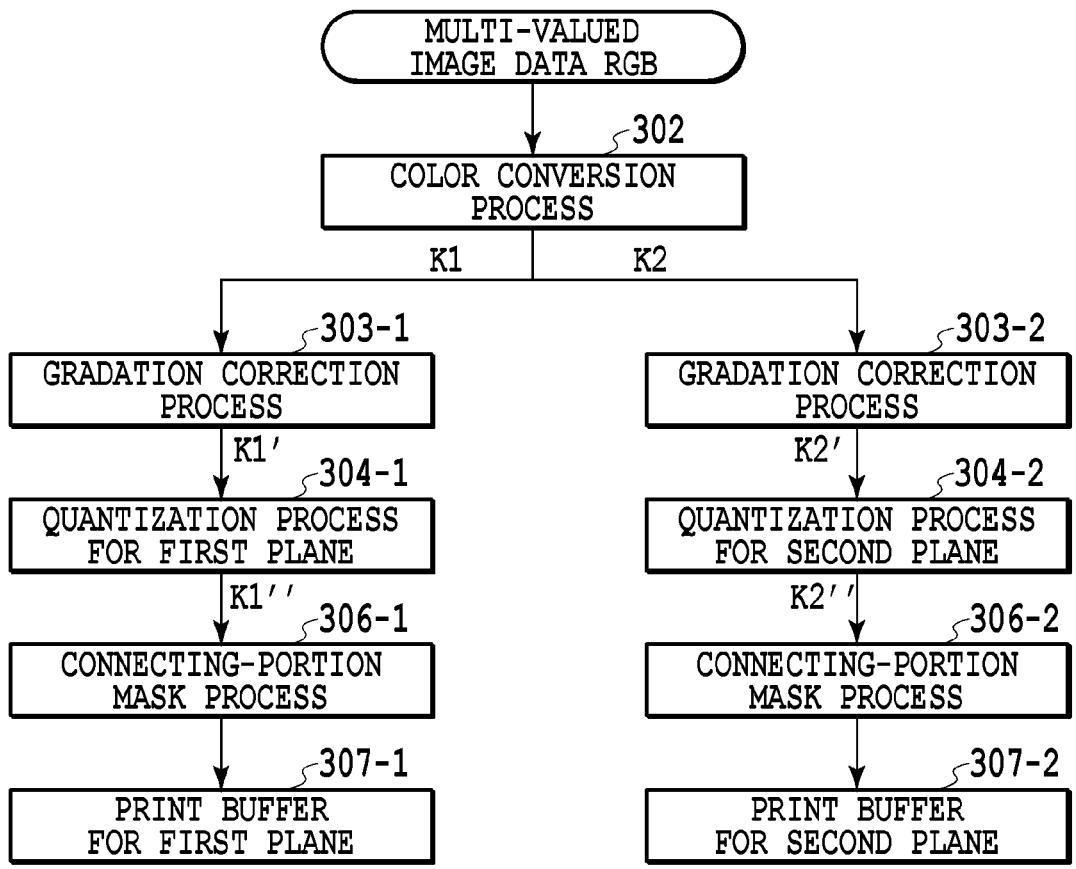
FIG. 26 is a block diagram showing a process for converting image data in a full-line type printing apparatus.

FIG. 26 is a block diagram for explaining a process for converting image data in a full-line type printing apparatus. A color conversion circuit 302 converts multi-valued RGB data into multi-valued image data CMYK corresponding to inks used by the printing apparatus and divides the converted data into pieces for two planes corresponding to a plurality of printing element arrays.

Figure 27:
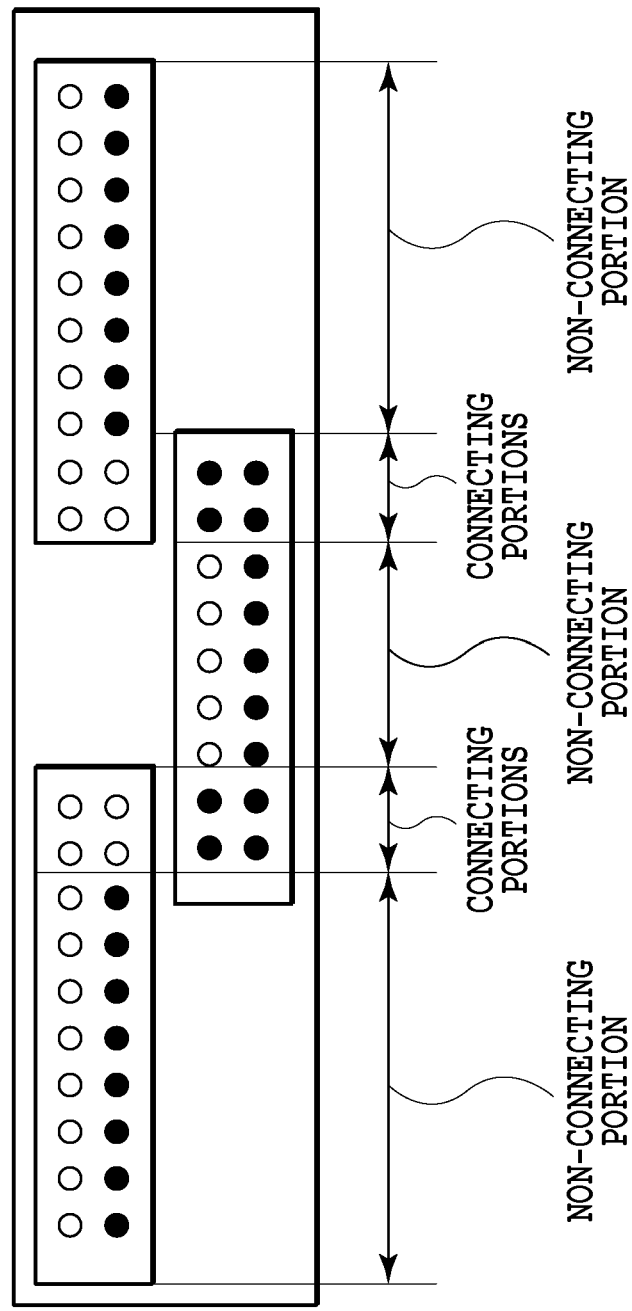
FIG. 27 is a diagram showing a correspondence between two planes and printing elements.
Figure 28A:
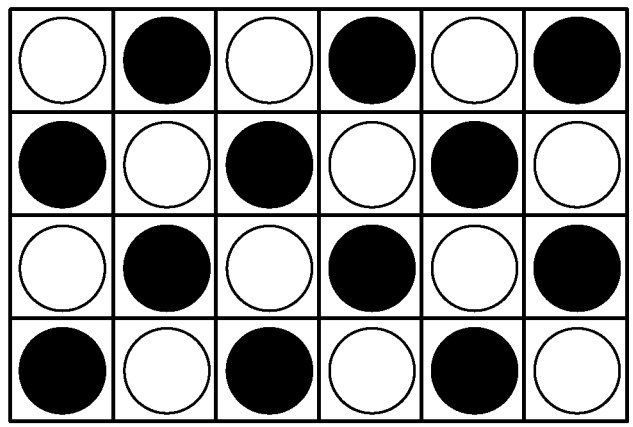
FIGS. 28A and 28B are diagrams for comparing dot arrangements.
Figure 28B:
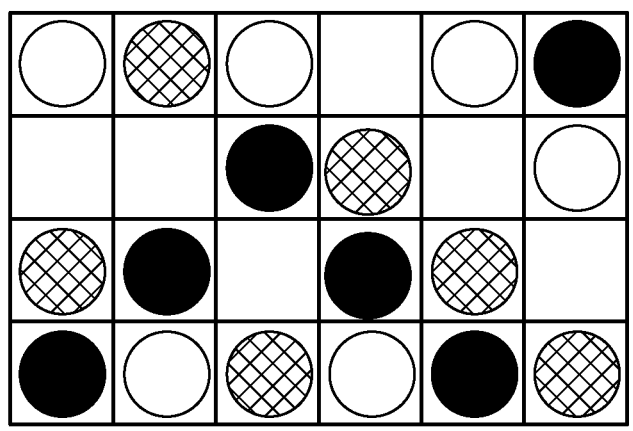

FIG. 27 is a diagram showing a correspondence between two planes and printing elements. A black circle shows a printing element for printing image data of a first plane, and a white circle shows a printing element for printing image data of a second plane. In a non-connecting portion, two printing element arrays arranged in one printing element substrate correspond to the first and second planes. Further, connecting portions include two printing element substrates each having two printing element arrays, and one of the printing element substrates corresponds to the first plane and the other of the printing element substrates corresponds to the second plane.

With reference to FIG. 26, again, multi-valued data C1, M1, Y1, K1 and multi-valued data C2, M2, Y2, K2 obtained by dividing data into pieces corresponding to the two planes are subjected to the gradation correction process 303-1 and 303-2 and the quantization process 304-1 and 304-2, in a manner similar to the one explained in the first embodiment and shown in FIG. 7. In this manner, as for black data, binary data C1", M1", Y1", K1" for the first plane and binary data C2", M2", Y2", K2" for the second plane are generated.

Further, in the present embodiment, the binary data C1", M1",Y1", K1" and the binary data C2", M2", Y2", K2" for the planes are subjected to connecting portion mask processes 306-1 and 306-2, respectively. In each plane, a plurality of dots arranged in one row in the Y direction are printed by one printing element in a non-connecting portion, or printed by two printing elements in a connecting portion of one printing element substrate. Accordingly, it is necessary to further distribute print data corresponding to the connecting portion into two printing element arrays, and in the present embodiment, print data is distributed by using mask patterns. In this regard, the form of a mask pattern is not limited, and may be a checker pattern in which pixels which can be printed and pixels which cannot be printed are alternately arranged in the X direction and the Y direction. Further, the mask pattern may be a random pattern in which pixels which can be printed and pixels which cannot be printed are randomly arranged. In any case, in the connecting portion mask processes 306-1 and 306-2, the binary data C1", M1", Y1", K1" for the first plane and the binary data C2", M2", Y2", K2" for the second plane are converted into binary data for the first plane and binary data for the second plane corresponding to the printing elements.

Thereafter, black binary data for the first plane is stored in a print buffer 307-1 for the first scan and printed by predetermined printing element arrays. Further, black binary data for the second plane is stored in a print buffer 307-2 for the second plane and printed by printing element arrays different from the ones used for the print data for the first plane.

In the present embodiment, different dither patterns are prepared for the quantization process 304-1 for the first plane and the quantization process 304-2 for the second plane. More specifically, as in the first, second, and fourth embodiments, the dither pattern for the first scan can be used as the dither pattern for the first plane, and the dither pattern for the second scan can be used as the dither pattern for the second plane. As explained with reference to FIG. 25B, the data for the first plane and the data for the second plane for the connecting portions are printed by four printing element arrays arranged in different printing element substrates, and are likely to be affected by displacement of the printing element substrates. Accordingly, the dither patters which are not affected by printing position displacement as explained in the above embodiments are used for the planes, whereby similar levels of the coverage of dots can be obtained for the connecting portion and the non-connecting portion. As a result, a uniform image without density unevenness can be output in an entire range of printing elements.

Incidentally, in the above-explained embodiments, explanation has been made on the case of using the printing apparatus shown in the electrical block diagrams of FIGS. 3 and 21, but the present invention is not limited to this configuration. For example, a host computer may perform the above image processing and then transmit processed print data to a printer engine unit in the printing apparatus via USB HUB or the like. In this case, an entire system including the host computer connected to the printer engine becomes the image forming apparatus of the present invention. In this regard, a system performing the above series of processes is within the scope of the present invention regardless of whether the processes are performed by hardware or software.

Further, in the above-explained embodiments, a printing system includes the host PC and the printing apparatus, but the present invention is not limited to this configuration. For example, the host PC may perform the above-described image processing and then transmit processed print data to the printer engine unit in the printing apparatus via USB HUB. In this case, the host computer connected to the printer engine becomes the image forming apparatus of the present invention. In this regard, a system performing the above series of processes is within the scope of the present invention regardless of whether the processes are performed by hardware or software.

The present invention is realized by program code of a computer-readable program to realize the function of the above-described image processing or a storage medium for storing the program code. In this case, the above-described image processing is realized by causing a computer (CPU or MPU) of a host apparatus or an image forming apparatus to read and execute the program code. Accordingly, the present invention also encompasses a computer-readable program for causing a computer to perform the above-described image processing and a storage medium for storing the program.

It is possible to use, as a storage medium for supplying the program code, a storage medium such as a floppy (registered trademark) disk, a hard disk, an optical disk, a magnetic optical disk, a CD-ROM, a CD-R, a magnetic tape, a non-volatile memory card, or a ROM.

Moreover, by the computer executing the read program code, not only can the functions of the embodiments described above be realized, but it is also possible for an OS of the computer to perform part or all of the actual processing based on the instructions of that program code. Furthermore, after the program code has been written on a function expansion board installed in the computer, or a memory of a function expansion unit that is connected to the computer, the CPU or the like can perform part or all of the actual processing based on the instructions of that program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2012-252255, filed Nov. 16, 2012, 2012-252256, filed Nov. 16, 2012, 2012-252261, filed Nov. 16, 2012, and 2013-182131, filed Sep. 3, 2013, which are hereby incorporated by reference herein in their entirety.

What is claimed is:

1. A dither pattern forming method for forming a dither pattern constituted by thresholds which are prepared for N pixels (N is a natural number) constituting a unit area and which are compared with the multi-valued gradation values of the N pixels to reduce gradation of the multi-valued gradation values, comprising:

a step of preparing at least a first dither pattern and a second dither pattern, wherein the thresholds are not yet set to some of pixels and the thresholds are already set to the other pixels for each of the first dither pattern and the second dither pattern;

a first obtaining step of obtaining information indicating whether or not a threshold is already set to a reference pixel and one or more pixels around the reference pixel for cases where each of the N pixels of the first dither pattern is set as the reference pixel; and a first determining step of determining a pixel, for which the threshold has not set yet, in the second dither pattern for setting a predetermined threshold is to be set based on the information obtained in the first obtaining step;

a first setting step of setting the predetermined threshold to the pixel determined in the first determining step in the second dither pattern;

a second obtaining step of obtaining information indicating whether or not a threshold is already set to the reference pixel and the pixels around the reference pixel for cases where each of the N pixels of the second dither pattern is the reference pixel after completing the first determining step;

a second determining step of determining, a pixel in the first dither pattern to which the predetermined threshold is to be set based on the information obtained in the second obtaining step;

a second setting step of setting the predetermined threshold to the pixel determined in the second determining step in the first dither pattern; and a step of incrementing the predetermined threshold and returning to the first obtaining step.

2. The dither pattern forming method according to claim 1 wherein the information includes information indicating a relative position relative to the reference pixel, of a pixel to which a threshold is already set, among the reference pixel and the pixels around the reference pixel.

3. The dither pattern forming method according to claim 2 wherein in the first determining step, the number of pixels to which a threshold is already set is summed for cases where each of the N pixels of the first dither pattern is the reference pixel with respect to each relative position relative to the reference pixel, whereby the pixel in the second dither pattern to which the predetermined threshold is to be set is determined among the pixels to which the thresholds are not yet set.

4. The dither pattern forming method according to claim 3 wherein in the first determining step, a pixel in the second dither pattern corresponding to a pixel in the first dither pattern such that the sums with respect to each relative position relative to the reference pixel become close to a uniform level is determined as the pixel in the second dither pattern to which the predetermined threshold is to be set.

5. The dither pattern forming method according to claim 1 wherein the predetermined threshold is a maximum or one larger than the maximum among already set thresholds in the second dither pattern which is being formed or the maximum plus one.

6. The dither pattern forming method according to claim 1 wherein the pixels around the reference pixel are eight upper-, lower-, right-, left-, and diagonal-side adjacent pixels relative to the reference pixel.

7. The dither pattern forming method according to claim 1, wherein the first dither pattern and the second dither pattern are formed by repeating the first obtaining step, the first determining step, the second obtaining step, and the second determining step.

8. The dither pattern forming method according to claim 1, wherein in the preparing step, a third dither pattern wherein the thresholds are not yet set to some of pixels and the thresholds are already set to the other pixels is further prepared, in the first obtaining step, the information indicating whether or not a threshold is already set to the reference pixel and the pixels around the reference pixel is obtained for cases where each of the N pixels of the first dither pattern is the reference pixel and for cases where each of the N pixels of the third dither pattern is the reference pixel, and in the second obtaining step, the information indicating whether or not a threshold is already set to the reference pixel and the pixels around the reference pixel is obtained for cases where each of the N pixels of the second dither pattern is the reference pixel and for cases where each of the N pixels of the third dither pattern is the reference pixel, the method further comprising:

a third obtaining step of obtaining the information indicating whether or not a threshold is already set to the reference pixel and the pixels around the reference pixel for cases where each of the N pixels of the first dither pattern is the reference pixel and for cases where each of the N pixels of the second dither pattern is the reference pixel after completing the second determining step;

a third determining step of determining pixel in the third dither pattern to which the predetermined threshold is to be set based on the information obtained in the third obtaining step, wherein the first dither pattern, the second dither pattern, and the third dither pattern are formed by repeating the first obtaining step, the first determining step, the second obtaining step, the second determining step, the third obtaining step, and the third determining step.

9. The first dither pattern and the second dither pattern formed by the dither pattern forming method according to claim 7.

10. An image processing apparatus for printing an image on a unit area by performing a first printing scan and a second printing scan of a printing head for the unit area of a printing medium, comprising:

an obtaining unit configured to obtain a first dither pattern and a second dither pattern that are formed according to a dither pattern forming method for forming a dither pattern constituted by thresholds which are prepared for N pixels (N is a natural number) constituting a unit area and which are compared with the multi-valued gradation values of the N pixels to reduce gradation of the multi-valued gradation values; and a quantizing unit configured to perform a gradation reduction process of a multi-valued gradation data corresponding to the first printing scan based on the first dither pattern and perform a gradation reduction process of a multi-valued gradation data corresponding to the second printing scan based on the second dither pattern, wherein said dither pattern forming method comprises a step of preparing at least a first dither pattern and a second dither pattern, wherein the thresholds are not yet set to some of pixels and the thresholds are already set to the other pixels for each of the first dither pattern and the second dither pattern;

a first obtaining step of obtaining information indicating whether or not a threshold is already set to a reference pixel and one or more pixels around the reference pixel for cases where each of the N pixels of the first dither pattern is set as the reference pixel; and a first determining step of determining a pixel, for which the threshold has not set yet, in the second dither pattern for setting a predetermined threshold is to be set based on the information obtained in the first obtaining step;

a first setting step of setting the predetermined threshold to the pixel determined in the first determining step in the second dither pattern;

a second obtaining step of obtaining information indicating whether or not a threshold is already set to the reference pixel and the pixels around the reference pixel for cases where each of the N pixels of the second dither pattern is the reference pixel after completing the first determining step;

a second determining step of determining, a pixel in the first dither pattern to which the predetermined threshold is to be set based on the information obtained in the second obtaining step;

a second setting step of setting the predetermined threshold to the pixel determined in the second determining step in the first dither pattern; and a step of incrementing the predetermined threshold and returning to the first obtaining step.

11. An image processing apparatus according to claim 10, further comprising a printing unit configured to perform the first printing scan and the second printing scan of the printing head according to gradation reduced data that is quantized by the quantizing unit.

12. An image processing apparatus for printing an image on a unit area of a printing medium by using a first printing head and a second printing head, comprising:

an obtaining unit configured to obtain a first dither pattern and a second dither pattern that are formed according to a dither pattern forming method for forming a dither pattern constituted by thresholds which are prepared for N pixels (N is a natural number) constituting a unit area and which are compared with the multi-valued gradation values of the N pixels to reduce gradation of the multi-valued gradation values; and a quantizing unit configured to perform a gradation reduction process of a multi-valued gradation data corresponding to the first head based on the first dither pattern and perform a gradation reduction process of a multi-valued gradation data corresponding to the second head based on the second dither pattern, wherein said dither pattern forming method comprises a step of preparing at least a first dither pattern and a second dither pattern, wherein the thresholds are not yet set to some of pixels and the thresholds are already set to the other pixels for each of the first dither pattern and the second dither pattern;

a first obtaining step of obtaining information indicating whether or not a threshold is already set to a reference pixel and one or more pixels around the reference pixel for cases where each of the N pixels of the first dither pattern is set as the reference pixel; and a first determining step of determining a pixel, for which the threshold has not set yet, in the second dither pattern for setting a predetermined threshold is to be set based on the information obtained in the first obtaining step;

a first setting step of setting the predetermined threshold to the pixel determined in the first determining step in the second dither pattern;

a second obtaining step of obtaining information indicating whether or not a threshold is already set to the reference pixel and the pixels around the reference pixel for cases where each of the N pixels of the second dither pattern is the reference pixel after completing the first determining step;

a second determining step of determining, a pixel in the first dither pattern to which the predetermined threshold is to be set based on the information obtained in the second obtaining step;

a second setting step of setting the predetermined threshold to the pixel determined in the second determining step in the first dither pattern; and a step of incrementing the predetermined threshold and returning to the first obtaining step.

13. An image processing apparatus according to claim 12, further comprising a printing unit configured to perform printing by using the first printing head and the second printing head according to gradation reduced data that is quantized by the quantizing unit.

14. A dither pattern forming method according to claim 1, wherein the first dither pattern and the second dither pattern are used for printing of a same color material.

15. A dither pattern forming method according to claim 1, wherein the first dither pattern and the second dither pattern are used for printing of different color materials.

16. An image processing apparatus according to claim 12, wherein the a first printing head and a second printing head print different color image.

17. A dither pattern forming method for forming a dither pattern constituted by thresholds which are prepared for N pixels (N is a natural number) constituting a unit area and which are compared with the multi-valued gradation values of the N pixels to reduce gradation of the multi-valued gradation values, comprising:

a step of preparing a first dither pattern and a second dither pattern, wherein the thresholds are not yet set to some of pixels of the N pixels and the thresholds are already set to the other pixels for each of the first dither pattern and the second dither pattern;

a first obtaining step of obtaining information indicating whether or not a threshold is already set to a reference pixel and one or more pixels around the reference pixel for cases where each of the N pixels of the first dither pattern is set as the reference pixel;

a first determining step of determining a pixel, for which the threshold has not set yet, in the second dither pattern for setting a predetermined threshold is to be set based on the information obtained in the first obtaining step; and a setting step of setting the predetermined threshold to the pixel determined in the first determining step, wherein in the first determining step the pixel is determines such that a ratio of the number of overlapping pixels to the N pixel becomes a predetermined ratio: the overlapping pixel being a pixel for which any threshold is set in both the first dither pattern and the second dither pattern.

18. A dither pattern forming method according to claim 17, wherein the predetermined ratio is zero in a region in which the value of threshold is low and gradually increases according to the value of threshold is greater in an intermediate region.

19. A non-transitory storage medium for storing a program for causing a computer to execute a dither pattern forming method for forming a dither pattern constituted by thresholds which are prepared for N pixels (N is a natural number) constituting a unit area and which are compared with the multi-valued gradation values of the N pixels to reduce gradation of the multi-valued gradation values, comprising:

a step of preparing at least a first dither pattern and a second dither pattern, wherein the thresholds are not yet set to some of pixels and the thresholds are already set to the other pixels for each of the first dither pattern and the second dither pattern;

a first obtaining step of obtaining information indicating whether or not a threshold is already set to a reference pixel and one or more pixels around the reference pixel for cases where each of the N pixels of the first dither pattern is set as the reference pixel;

a first determining step of determining a pixel, for which the threshold has not set yet, in the second dither pattern for setting a predetermined threshold is to be set based on the information obtained in the first obtaining step;

a first setting step of setting the predetermined threshold to the pixel determined in the first determining step in the second dither pattern;

a second obtaining step of obtaining information indicating whether or not a threshold is already set to the reference pixel and the pixels around the reference pixel for cases where each of the N pixels of the second dither pattern is the reference pixel after completing the first determining step;

a second determining step of determining, a pixel in the first dither pattern to which the predetermined threshold is to be set based on the information obtained in the second obtaining step;

a second setting step of setting the predetermined threshold to the pixel determined in the second determining step in the first dither pattern; and a step of incrementing the predetermined threshold and returning to the first obtaining step.

* * * * *